US010944276B2

(12) United States Patent
Smith

(10) Patent No.: US 10,944,276 B2
(45) Date of Patent: Mar. 9, 2021

(54) PORTABLE POWER SUPPLY DEVICE

(71) Applicant: Remvo Inc., Scottsdale, AZ (US)

(72) Inventor: John S. Smith, Delray Beach, FL (US)

(73) Assignee: REMVO Inc., Scottsdale, AZ (US)

( * ) Notice: Subject to any disclaimer, the term of this patent is extended or adjusted under 35 U.S.C. 154(b) by 50 days.

(21) Appl. No.: 16/045,529

(22) Filed: Jul. 25, 2018

(65) Prior Publication Data
US 2019/0036359 A1    Jan. 31, 2019

Related U.S. Application Data

(60) Provisional application No. 62/537,123, filed on Jul. 26, 2017.

(51) Int. Cl.
H02J 7/34    (2006.01)
H02J 7/00    (2006.01)
(Continued)

(52) U.S. Cl.
CPC .......... H02J 7/0027 (2013.01); H02J 7/0044 (2013.01); H02J 7/0045 (2013.01); H02J 7/02 (2013.01);
(Continued)

(58) Field of Classification Search
CPC ........ H02J 7/0027; H02J 7/342; H02J 7/0044; H02J 7/0045; H02J 7/02; H02J 7/35; H02J 7/00; H02J 7/345; H02S 10/20; H02S 10/40; H02S 20/32; H02S 30/20; F21Y 2115/10; F21Y 115/10; F21L 4/08; F21V 21/084; F25B 21/02; F25B 21/04
See application file for complete search history.

(56) References Cited

U.S. PATENT DOCUMENTS 3,305,772 A * 2/1967 Earnhart ............... H01H 43/00
324/537
4,590,943 A    5/1986 Paull
(Continued)

OTHER PUBLICATIONS

International Search Report and Written Opinion dated Feb. 7, 2017 in International Application No. PCT/US2016/064350. 14 pages.
(Continued)

Primary Examiner — Robert L Deberadinis
(74) Attorney, Agent, or Firm — Maschoff Brennan; Jonathan M. Benns

(57) ABSTRACT

The device housing includes a roller cradle. The device can include a device support roller rotationally located in the roller cradle, the device support roller being removably couplable with the roller cradle. Also, a release mechanism can be include, where the release mechanism includes a push button operably coupled to a coupler mechanism that is operably coupled to the device support roller. The release mechanism and/or coupler mechanism are biased. When the release mechanism is not activated, the device support roller is engaged, and when the release mechanism is active, the device support roller is disengaged. The system can include a plurality of device support rollers, each device support roller having a device-receiving slot, each device-receiving slot being of a different shape and/or dimension from the other device-receiving slots of the other device support rollers.

22 Claims, 16 Drawing Sheets

(51) Int. Cl.
  *H02S 20/32* (2014.01)
  *H02S 30/20* (2014.01)
  *H02J 7/35* (2006.01)
  *H02S 10/40* (2014.01)
  *H02J 7/02* (2016.01)
  *H02S 10/20* (2014.01)
  *F21Y 115/10* (2016.01)
  *F25B 21/04* (2006.01)
  *F21L 4/08* (2006.01)
  *F21V 21/084* (2006.01)
  *F25B 21/02* (2006.01)

(52) U.S. Cl.
  CPC ............ *H02J 7/342* (2020.01); *H02J 7/35* (2013.01); *H02S 10/20* (2014.12); *H02S 10/40* (2014.12); *H02S 20/32* (2014.12); *H02S 30/20* (2014.12); *F21L 4/08* (2013.01); *F21V 21/084* (2013.01); *F21Y 2115/10* (2016.08); *F25B 21/02* (2013.01); *F25B 21/04* (2013.01); *H02J 7/00* (2013.01)

(56) References Cited

U.S. PATENT DOCUMENTS

| | | |
|---|---|---|
| 6,215,273 B1 | 4/2001 | Shy |
| 2006/0006838 A1 | 1/2006 | Clarke |
| 2006/0250764 A1 | 11/2006 | Howarth et al. |
| 2006/0268162 A1 | 11/2006 | Kayanuma |
| 2007/0240442 A1* | 10/2007 | Costanzo ............ F25B 27/005 62/235.1 |
| 2007/0285049 A1* | 12/2007 | Krieger ............ H01M 2/1055 320/105 |
| 2008/0084645 A1* | 4/2008 | Ahmad, Jr. ............ H02J 7/35 361/103 |
| 2009/0002524 A1 | 1/2009 | Desorbo |
| 2013/0001379 A1 | 1/2013 | Hobbs |
| 2013/0241488 A1 | 9/2013 | Dao |
| 2014/0328009 A1 | 11/2014 | Chang et al. |

OTHER PUBLICATIONS

International Preliminary Report on Patentability: dated Jun. 14, 2018 in International App. No. PCT/US2016/064350.

* cited by examiner

PORTABLE POWER SUPPLY DEVICE

CROSS-REFERENCE

This patent application claims priority to U.S. Provisional Application No. 62/537,123 filed Jul. 26, 2017, which provisional is incorporated herein by specific reference in its entirety.

BACKGROUND

Various types of electronic devices including laptop computers, cell phones, personal digital assistants, digital cameras, portable DVD players and the like are in widespread use today. For each type of electronic device, a power supply is needed. A typical power supply includes either disposable batteries or rechargeable batteries. A rechargeable battery may be recharged using a battery charger.

A conventional battery charger may include a transformer box which is fitted with an outlet plug for connecting to an electrical power outlet (e.g., a wall outlet), along with an elongated charger cord that connects to the electronic device which is to be charged. While conventional plug-in battery chargers are cost effective and energy efficient, they require an electrical power outlet and are therefore non-autonomous.

Portable power supply devices can be beneficial to provide electrical power to electronic devices when pluggable electrical power is not available. While electronic devices can include batteries and may be plugged into a wall electrical outlet to receive power and to charge batteries, once the batteries lose power or when no pluggable electrical outlet is available, the electronic devices can be rendered useless. In certain circumstances, a powerless electronic device can result in serious consequences. For example, if the electronic device is a medical device or used to keep a patient alive, loss of power to the electronic device may result in morbidity to the patient.

As an alternative to conventional plug-in battery chargers, autonomous portable battery chargers have been developed. Portable battery chargers generally include one or more internal batteries and one or more outlets for connecting the charger to the device to be charged. Portable battery chargers are typically designed for the common everyday user and are often fitted with additional features such as USB charging ports, DC outlets, a flashlight, and a jump starter. These features may be insufficient for specialized users such as medical professionals, veterinarians, electronics technicians or other persons having to carry out and document complex manual procedures. Moreover, specialized users who are carrying out complex procedures on the go (e.g., a doctor providing medical care in an emergency camp) will greatly benefit from having to carry a minimal number of devices and yet be equipped with sufficiently powerful and versatile equipment to carry out his or her tasks (e.g., prevent morbidity).

Accordingly, there is an established and increasing need for portable power supply devices which are particularly useful in certain scenarios and by specialized users. For instance, portable power supply devices providing diverse integrated features that are especially useful for medical professionals, veterinarians, electronics technicians or other persons having to carry out and document complex manual procedures, are desirable.

SUMMARY

In an embodiment, a portable power supply system can include a portable power supply device having: a device housing; a controller in the device housing; at least one battery in the device housing and operably connected to the controller; and at least one electrical port operably connected to the at least one battery, the at least one electrical port being configured for providing electrical power from the at least one battery to an external electrically-powered device under control of the controller; and optionally, at least one component pluggable into the portable power supply device, the at least one component either providing power to the at least one battery or receiving power from the at least one battery when plugged.

In some embodiments, the device housing includes a roller cradle formed therein. In some aspects, the portable power supply device includes a device support roller rotationally located in the roller cradle, the device support roller being removably couplable with the roller cradle. In some aspects, the portable power supply device further comprising a release mechanism. In some aspects, the release mechanism including a push button operably coupled to a coupler mechanism, the coupler mechanism being operably coupled to the device support roller. In some aspects, the release mechanism and/or coupler mechanism are biased such that when the release mechanism is not activated, the device support roller is engaged with the roller cradle, and when the release mechanism is active, the device support roller is disengaged from the roller cradle so as to be removable from the portable power supply device. In some aspects, the power supply system can include a plurality of device support rollers, each device support roller having a device-receiving slot, each device-receiving slot being of a different shape and/or dimension from the other device-receiving slots of the other device support rollers. In some aspects, the roller cradle having an electrical connector that is electrically connected to an electrical adapter that is within a device-receiving slot of the device support roller. In some aspects, the electrical adapter is retractable.

In some embodiments, an electrical adapter retraction mechanism is proved. In some aspects, the electrical adapter retraction mechanism includes a switch that in a first position fixes the electrical adapter to be exposed in the device-receiving slot and that the switch in a second position causes the electrical adapter to be retractable into the device support rollers.

In some embodiments, the portable power supply system can include a custom carrying case adapted and shaped to firmly retain the portable power supply device therein.

In some embodiments, the at least one component is included and is a solar power system having at least one solar panel. In some aspects, the solar power system is adapted to plug into a port on the portable power supply device in order to charge the one or more batteries. In some aspects, the solar power system has at least one foldable solar panel. In some aspects, the solar power system has a mechanism that automatically tilts the solar panel in accordance with receiving maximum solar rays. In some aspects, a support pole system that is adapted to attach to the solar panel. In some aspects, the foldable solar panel has at least two individual panels coupled together via a hinge.

In some embodiments, the portable power supply system can include a plurality of electrical ports, each electrical port having a unique color and/or pattern from the other electrical ports. The system can also include a plurality of electrical plugs (e.g., corresponding to the electrical ports), wherein there is an electrical plug for each electrical port such that the corresponding electrical plug and electrical port have the same color and/or pattern.

In some aspects, the at least one component includes at least one headlamp having a rechargeable battery that can be recharged by the portable power supply device when electrically coupled therewith. In some aspects, the at least one component includes at least one light stick having a plurality of LED lights and a rechargeable battery that can be recharged by the portable power supply device when electrically coupled therewith. In some aspects, the at least one component includes at least one thermoelectric refrigerator having a rechargeable battery that can be recharged by the portable power supply device when electrically coupled therewith.

In some embodiments, the portable power supply system can include a plurality of electrical ports, each port being associated with a switch that turns power on/off to the associated electrical port.

In some embodiments, the portable power supply system can include a charging grid comprising a plurality of charging stations, each charging station having a charging contact that is adapted to contact a device contact on the portable power supply device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information, as well as other features of this disclosure, will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
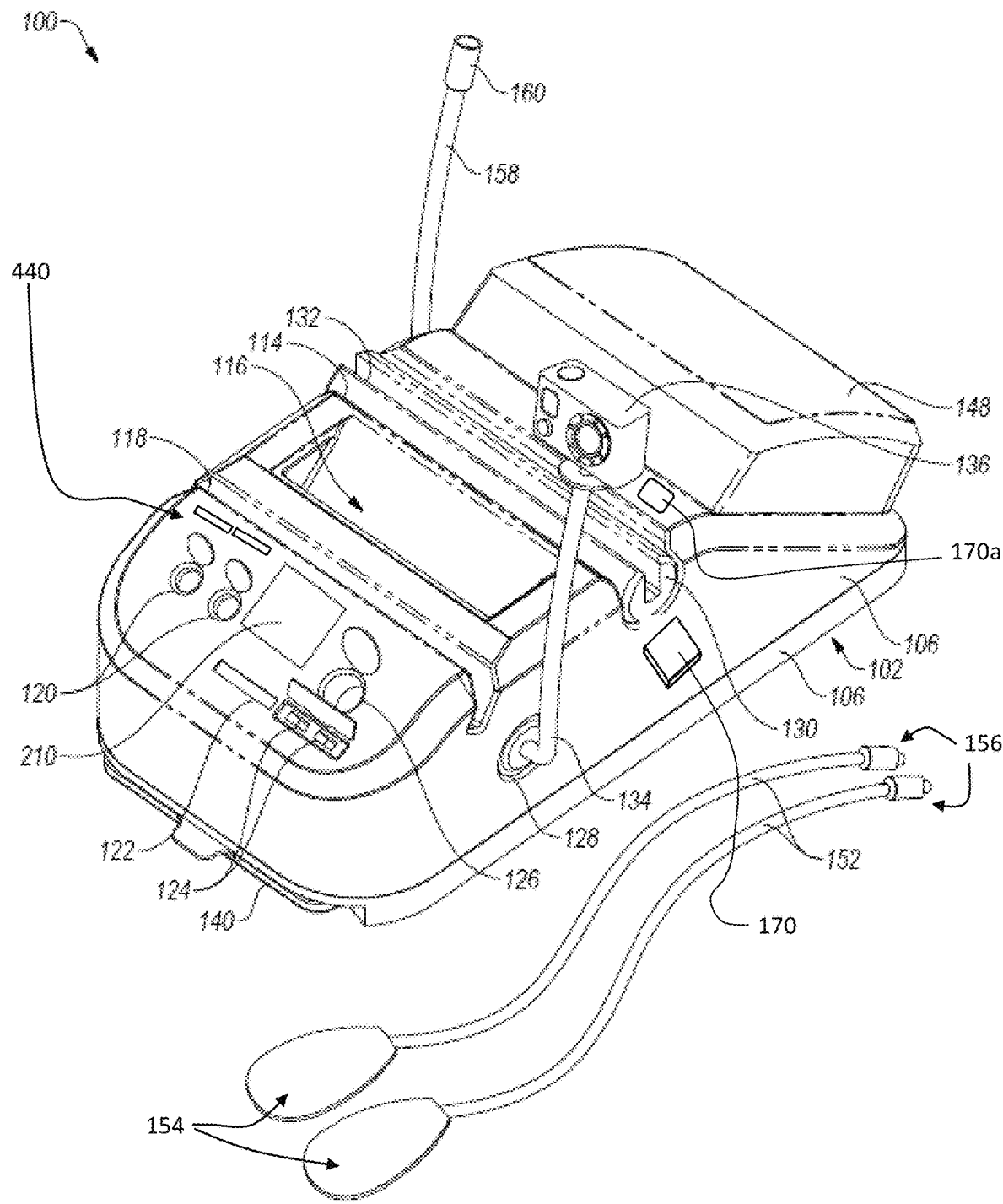
FIG. 1 presents a top front perspective view of an illustrative embodiment of the portable power supply device of the present invention.

The components of the figures can be arranged in accordance with at least one of the embodiments described herein, and which arrangement may be modified in accordance with the disclosure provided herein by one of ordinary skill in the art. Like reference numerals refer to like parts throughout the several views of the drawings. Features of one figure may be included in an embodiment of another figure. While electrical ports/connectors/adapters are shown to be female configurations (recess, outlet), they may instead be male configurations (plugs), or combinations of male and female configurations. While electrical ports/connectors/adapters are shown to be male configurations (plugs), they may instead be female configurations, or combinations of male and female configurations. The electrical ports/connectors/adapters may be operably coupled with the one or more batteries and/or controller as known in the art.

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present invention relates generally to devices for supplying electrical power for equipment, and more particularly, to a portable power supply device which is lightweight, space-efficient and easy to carry and can be used by medical professionals, veterinarians, electronics technicians or other persons having to carry out and document complex manual procedures. The device has certain features and components that allow for use by medical professionals, veterinarians, electronics technicians or other persons out away from a pluggable power supply, which can allow for performance of services in remote locations.

In one embodiment, the portable power supply device includes a device housing. A hand grip recess may be provided in the device housing for gripping and carrying purposes. At least one battery, such as a lithium ion battery, may be contained in the device housing. Various electrical ports such as defibrillator connector ports and USB charging ports may be provided on the exterior of the device housing so as to provide electricity to a defibrillator, light, camera, or other electronic device. A rotatable device support roller having an elongated roller slot may be mounted in a roller cradle in the device housing, which may have an electrical connector to electronically couple to an electronic device. An electronic device such as a tablet or cell phone can be inserted in the roller slot and supported at a desired orientation by rotation of the device support roller in the roller slot, and where the electrical connector can electrically connect to the electronic device. At least one DC/AC inverter may be provided on the device housing to convert DC voltage and current into AC voltage and current for powering any of a variety of external electronic devices. One DC/AC inverter may be configured to convert AC voltage and current into DC voltage and current in order to charge the one or more batteries with DC current when an AC plug is plugged into an AC outlet. A camera mount arm may be mounted on the device housing to support a video camera. A light mount arm may be mounted on the device housing to support a light. Other features and components of the portable power supply device are described herein.

In one embodiment, the portable power supply device can include: a device housing; a controller in the device housing; at least one battery in the device housing and connected to the controller; at least one electrical port for providing electrical power from the at least one battery to an external electrically-powered device; and an extendable tray, which can be in an extended position in which the tray protrudes outwardly from the device housing, and in a retracted position in which the tray is concealed within the device housing. In a second aspect, the at least one battery comprises at least one lithium ion battery. In another aspect, the portable power supply device can further include at least one defibrillator connector port on the device housing and connected to the controller. In another aspect, the portable power supply device can further include a female DC outlet on the device housing and connected to the controller. In another aspect, the portable power supply device can further include a DC/AC inverter on the device housing and connected to the controller. In another aspect, a camera mount arm may extend from the device housing to support any type of camera, such as a still picture camera and/or video camera, where the camera may be integrated to the arm or separate and mountable thereto. In another aspect, a light mount arm may extend from the device housing to support a light, where the light may be integrated or separate and mountable thereto. In another aspect, a hand grip recess may be provided in the device housing for gripping and carrying the portable power supply device. In another aspect, a roller cradle may be provided in the device housing and a device support roller having an elongated roller slot may be provided in the roller cradle to support an electronic device such as a tablet or cell phone in a desired orientation (e.g., landscape and/or portrait). In another aspect, a battery level indicator may be provided in the device housing to indicate the level of electric charge in the battery or batteries. In another aspect, a device slot may be provided in the device housing to support an electronic device in a fixed orientation. The camera may also be operably coupled with the controller and/or computer of the device.

Shown throughout the figures, the present invention is directed toward a portable power supply device which is lightweight, space-efficient and easy to carry and can be used by medical professionals, veterinarians, electronics technicians or other persons having to carry out and document complex manual procedures, both indoors and outdoors.

Figure 2:
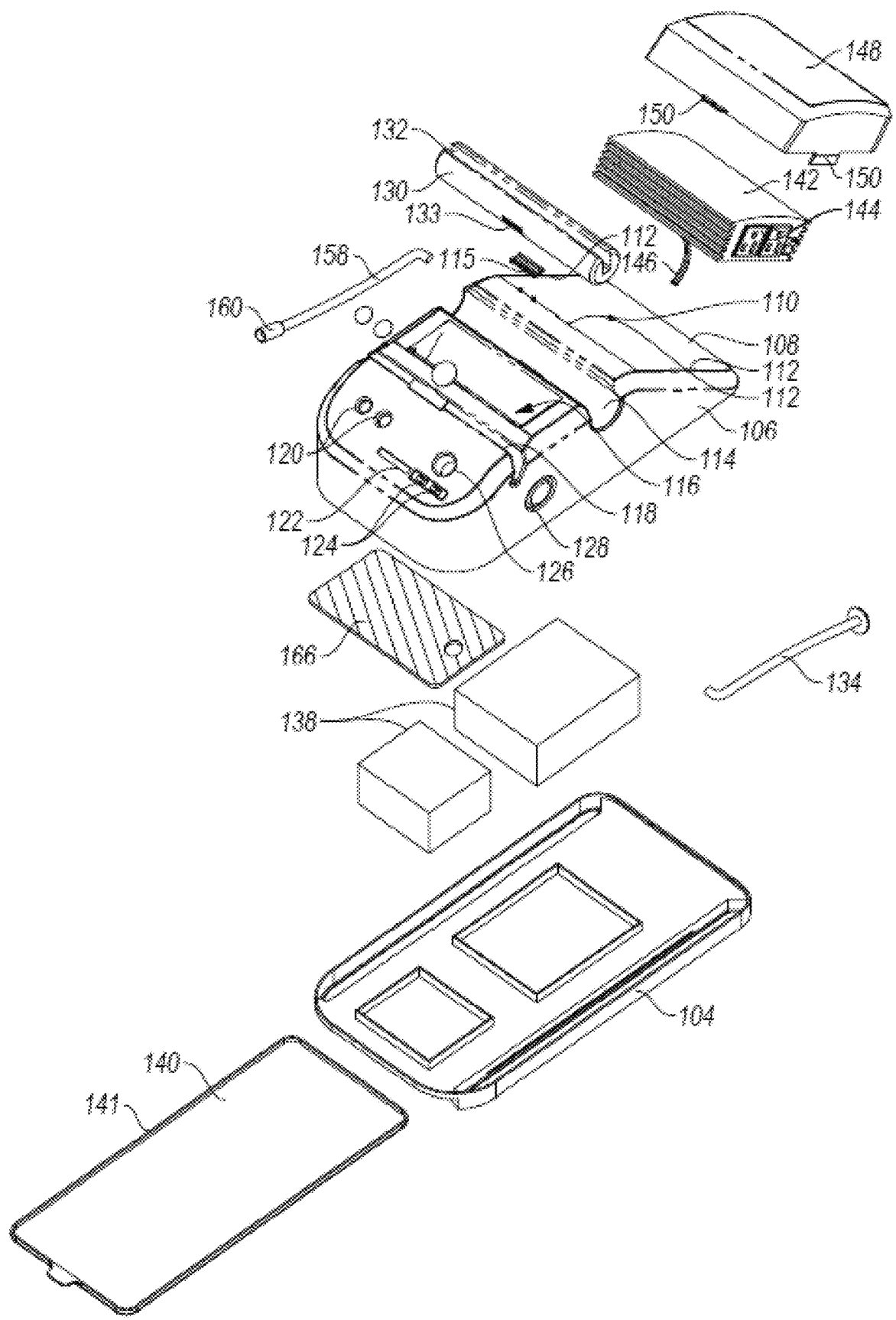
FIG. 2 presents a top front exploded perspective view of the portable power supply device.

Referring initially to FIGS. 1 and 2, a portable power supply device 100 is illustrated in accordance with an exemplary embodiment of the present invention. As shown, the portable power supply device 100 includes a device housing 102. In some embodiments, the device housing 102 may include a bottom housing portion 104 and a top housing portion 106 mounted on the bottom housing portion 104, which may be removably coupled or integrated or affixed. In other embodiments, the device housing 102 may have alternative designs.

A controller 166 such as a Printed Circuit Board (PCB), for example and without limitation, may be provided in the device housing 102. The controller 166 may include the electrical circuitry (not illustrated) which facilitates operation of the various functions of the portable power supply device 100. The controller 166 may be configured as a computer or computing device that has a processor or microprocessor. The controller 166 may be hardware with or without firmware. In one option, the controller 166 is a computer 600 with the features described herein and illustrated in FIG. 7, where the housing 102 can include any of the ports, connectors, or other features for such a computer 600. In one option, the controller 166 can be coupled to a computer for advanced functionality, and thereby a system can include the device 100 and computer.

At least one battery 138 may be contained in the device housing 102. The at least one battery 138 may electrically interface with the controller 166. The at least one battery 138 may be supported by the bottom housing portion 104 and may be secured thereto according to the knowledge of those skilled in the art. In some embodiments, the at least one battery 138 may include a lithium ion battery. In some embodiments, the portable power supply device 100 may include a single battery 138. In other embodiments, the portable power supply device 100 can include two or more batteries 138. The two or more batteries 138 may be serially connected to provide increased voltage. In other embodiments, the two or more batteries 138 may be connected in parallel to provide increased current. In still other embodiments, multiple batteries 138 may be connected in serial and parallel configuration to provide both increased voltage and current. In one aspect, the positive terminals of the one or more batteries may be coupled together without an electrical line leading from the junction of the coupling as is known in the art.

In some embodiments, a user-operable control (e.g., computer 600, see FIG. 7) may be provided on the device housing 102 and interface with the controller 166 for switching the internal electrical configuration of the battery connection from a serial configuration to a parallel configuration, and vice-versa. The computer 600 can include computer executable instructions for charging external devices through the one or more electrical ports on the housing 102. The computer 600 can be controlled by the user, such as through a touch screen interface, which can be the display 210. Alternatively, an external electronic device, such as a tablet or smart phone, may be electrically connected to the device 100 so as to be capable of providing input to the computer 600 and receiving information to display from the computer 600.

As illustrated in FIG. 2, in some embodiments, an extendable and retractable tray 140 may be selectively extended and retracted from and into the device housing 102, and particularly from and onto the bottom housing portion 104, in sliding relation for purposes which will be hereinafter described. The tray 140 may include an outer peripheral tray rim 141 which prevents tools or other items placed on the tray 140 from inadvertently rolling or sliding off the tray 140. The tray 140 may be fabricated of aluminum or plastic, for example and without limitation. In some embodiments, an antibacterial surface or coating (not illustrated) may be provided on the tray 140. While not specifically shown, the tray 140 may have an openable and closable lid that fits on the tray rim 141.

As particularly illustrated in FIG. 2, the top housing portion 106 of the device housing 102 may have an inverter support surface 108. An inverter cable opening 110 may extend through the inverter support surface 108. A DC/AC inverter 142 may be provided on the inverter support surface 108. The DC/AC inverter 142 may include at least one AC socket 144 which facilitates electrical connection of an AC-powered electrical device (not illustrated) to the DC/AC inverter 142. An inverter cable 146 may be electrically connected to the batteries 138, preferably via the controller 166 inside the device housing 102. An inverter cover 148 may be provided on the DC/AC inverter 142 to cover the DC/AC inverter 142. Cover tabs 150 on the inverter cover 148 may detachably engage companion tab slots 112 in the top housing portion 106 to detachably secure the inverter cover 148 on the inverter support surface 108 and retain the DC/AC inverter 142 within. In some embodiments, the DC/AC inverter 142 may be adhered or attached to the inverter support surface 108 by an adhesive or mechanical fastener. The DC/AC inverter 142 may convert DC voltage and current from the battery or batteries 138 to AC voltage and current that can be delivered through the AC socket or sockets 144. For instance, the DC/AC inverter 142 may be configured to deliver 300 W of AC power. In some embodiments, the DC/AC inverter 142 may be an inverter/charger which facilitates charging of the battery or batteries 138 through the DC/AC inverter 142, such as by providing an input AC power through an AC socket 144.

Figure 8:
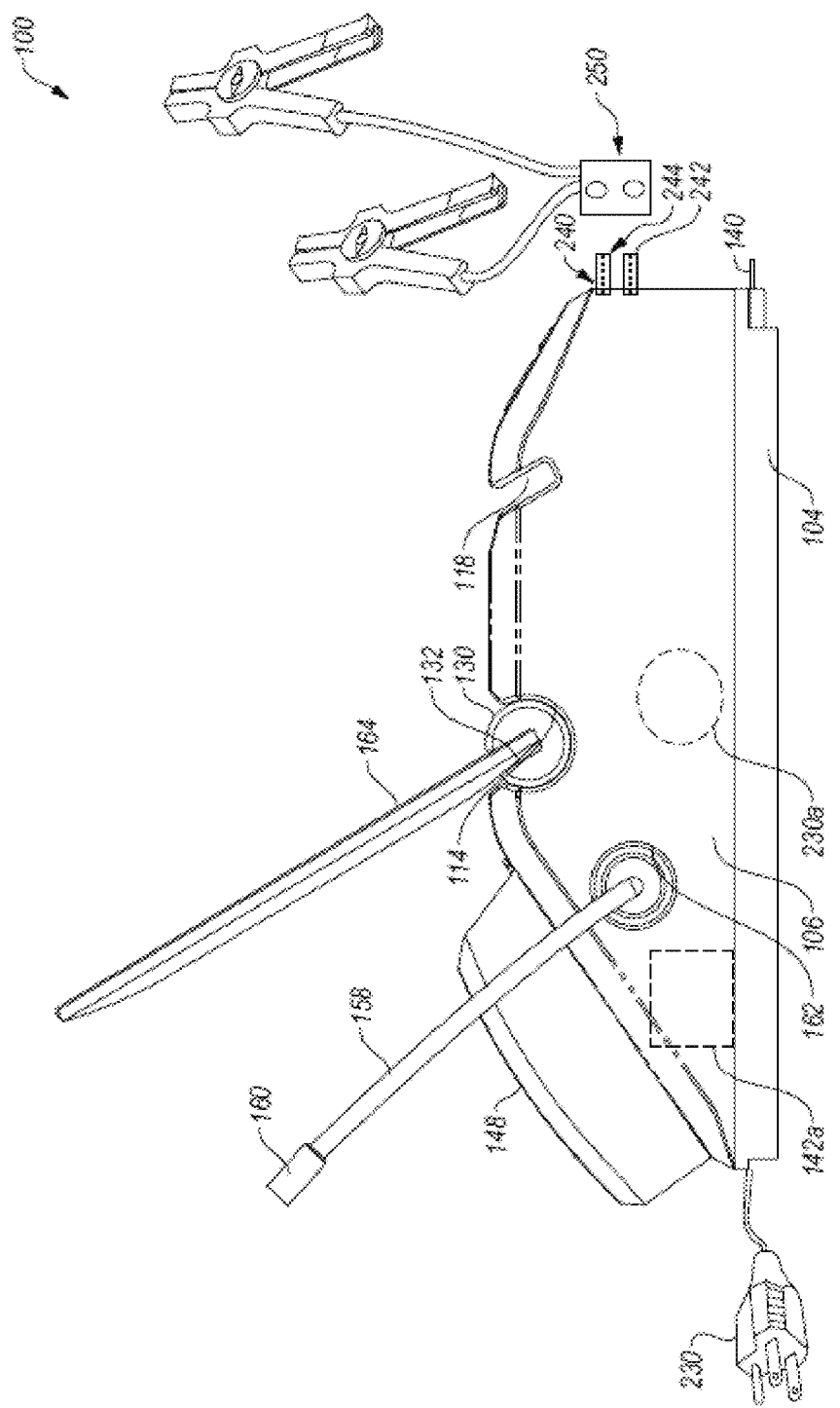
FIG. 8 represents the portable power supply device having various optional features, any of which may be included in any of the embodiments.

Also, as shown in FIG. 8 a second inverter 142a can be included that is a dedicated recharging inverter that receives AC current via a charging plug 230 so as to recharge the batteries, which may be internal to the housing. Also, the inverter 142 may also be included inside the housing 102 rather than mounted on the outside and covered with the cover 148. The charging plug 230 may be on a retractable mechanism or formed into a recess on the surface of the housing as shown by the dashed circle 230a. Also, the charging plug 230 can be a two prong plug or adapted for any electrical configuration needed for any type of electrical grid across the world. However, the device 100 may only have one charging plug, either having the cord or in a recess or protruding from the housing 102 without a cord.

Figure 6:
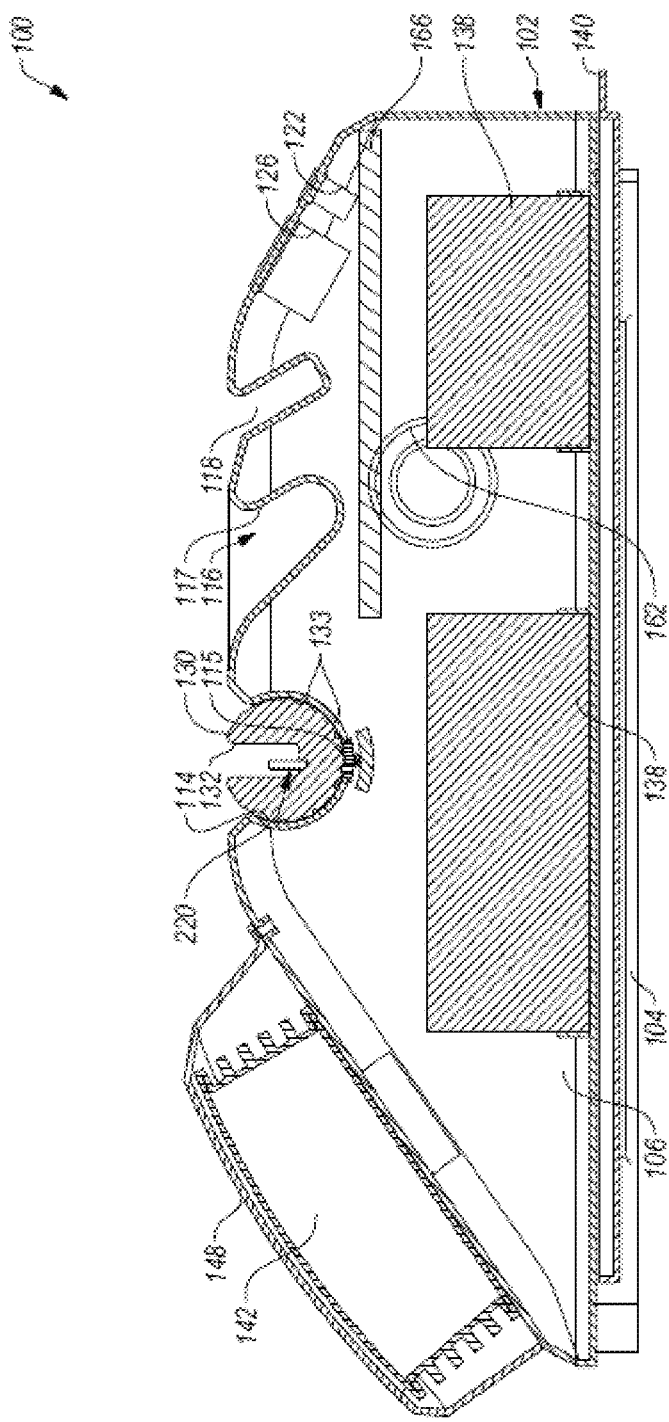
FIG. 6 is a cross-sectional left side elevation view of the portable power supply device.

In some embodiments, a roller cradle 114 may be provided in the top housing portion 106 of the device housing 102. The roller cradle 114 may extend in transverse relationship to the longitudinal axis of the device housing 102. The roller cradle 114 can include a bottom insert providing one or more transverse ridges 115; in alternative embodiments, the transverse ridge or ridges 115 can be integrally formed on the top housing portion 106, such as by plastic injection molding. A device support roller 130 may be disposed for rotation inside the roller cradle 114 about a central axis of the device support roller 130, the central axis being arranged transversely to the longitudinal direction of the device housing 102. An elongated roller slot 132 may traverse the length of the device support roller 130. As shown in FIG. 2, the device support roller 130 can include bottom ridges 133 arranged parallel to the central axis of the device support roller 130, configured to engage with the housing transverse ridges 115 (as shown in FIG. 6) and provide discrete stops to the rotation of the device support roller 130. Alternative embodiments are contemplated, however, in which the device support roller 130 can be rotated by the user to any gradual angle, and retained by friction at a selected angle. FIG. 6 also shows the electrical adapter 220 in the elongated roller slot 132 that can include any electrical connector that can be connected into an electronic device that is located in the elongated roller slot 132. This allows the electronic device to be charged via the electrical adapter 220 from the one or more batteries 138.

Figure 4:
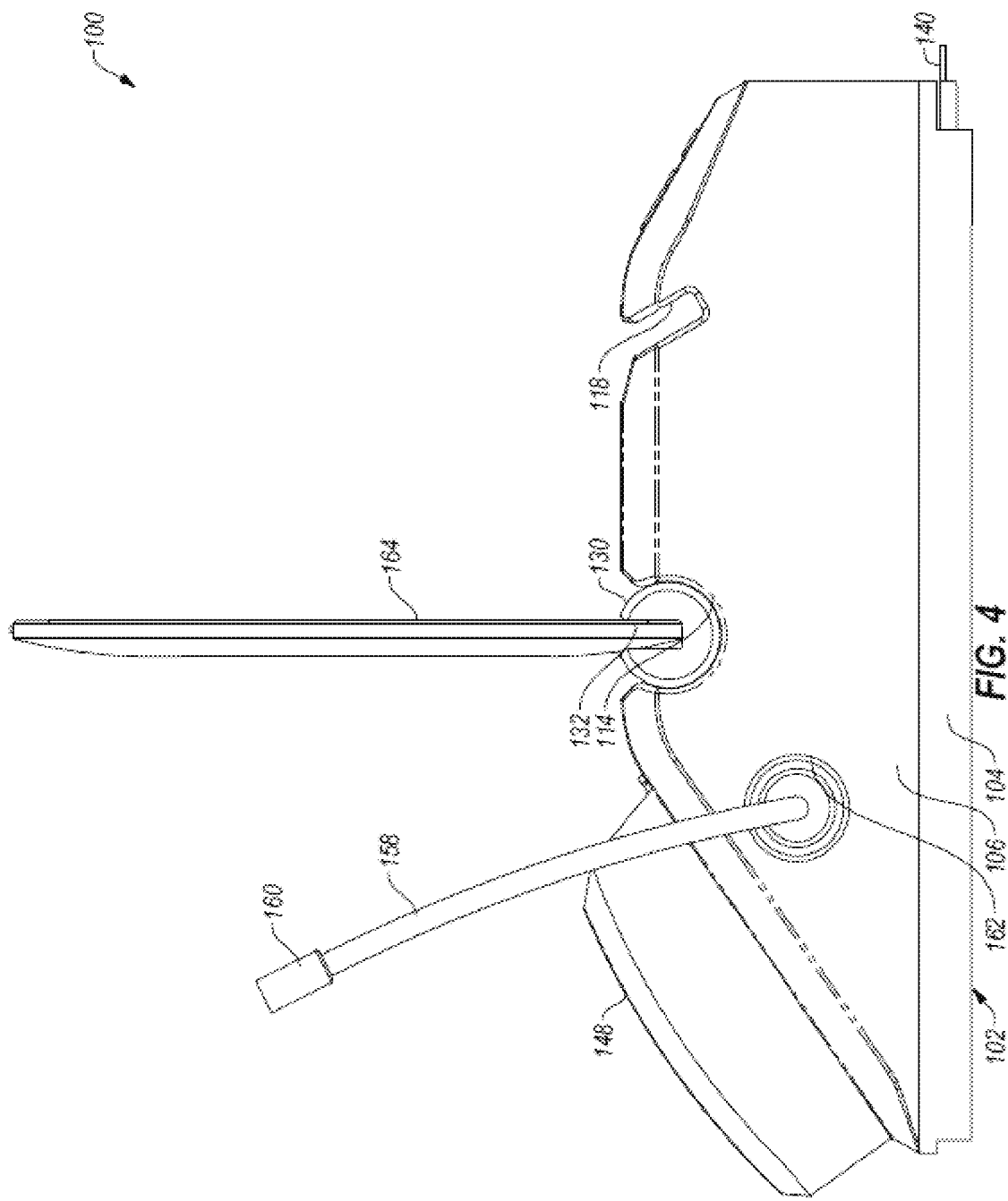
FIG. 4 presents a left side elevation view of the portable power supply device in a second configuration in which a tablet is docked in the roller slot of the device support roller and the light mount arm is shown in a raised position for filming of a procedure using the video camera on the raised camera mount arm (not illustrated).
Figure 5:
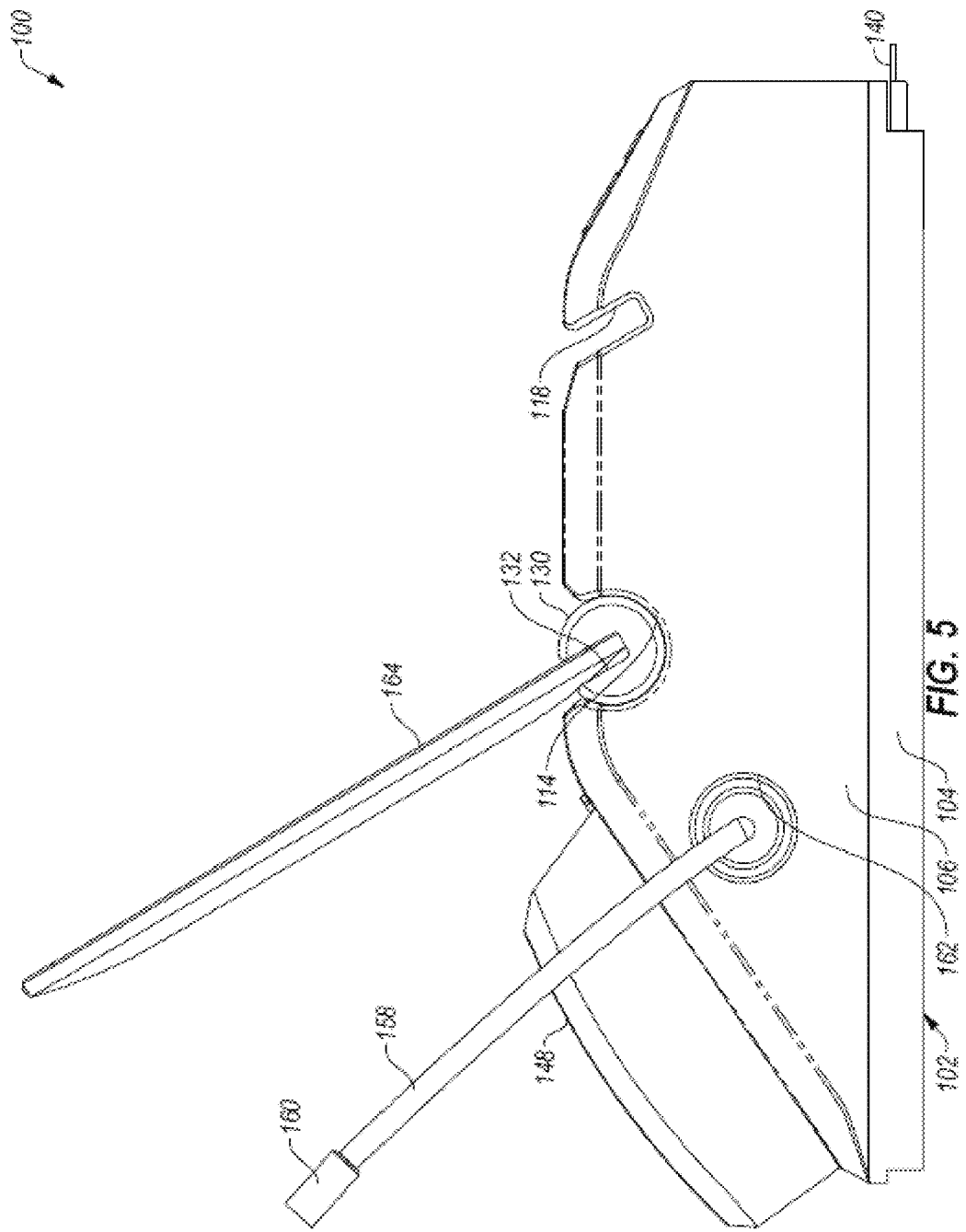
FIG. 5 presents a left side elevation view of the portable power supply device in a third configuration in which a tablet is docked in the roller slot of the device support roller and the light mount arm is shown in a raised position, both at a downward angle with respect to that shown in FIG. 4, for filming of a procedure taking place closer to the device, using the video camera on the raised camera mount arm (not illustrated).

As illustrated in FIGS. 4 and 5, in typical application of the portable power supply device 100, which will be hereinafter described, a device 164 such as a cell phone or tablet or computer can be inserted in the roller slot 132 such that the device support roller 130 supports the device 164 at a selected angle of a range of available angles, for viewing information on the device 164 or using the device 164 for other applicable purposes.

As illustrated in FIGS. 1 and 2, in some embodiments, a hand grip recess 116 may extend into the top housing portion 106 of the device housing 102. The hand grip recess 116 may extend in transverse relationship to the longitudinal axis of the device housing 102, and preferably extends in an oblique downward direction thereby defining an oblique or horizontal inner gripping surface 117 as shown in FIG. 6. The inner gripping surface 117 of the hand grip recess 116 may enable a user (not illustrated) to easily grip, carry and handle the portable power supply device 100.

Figure 3:
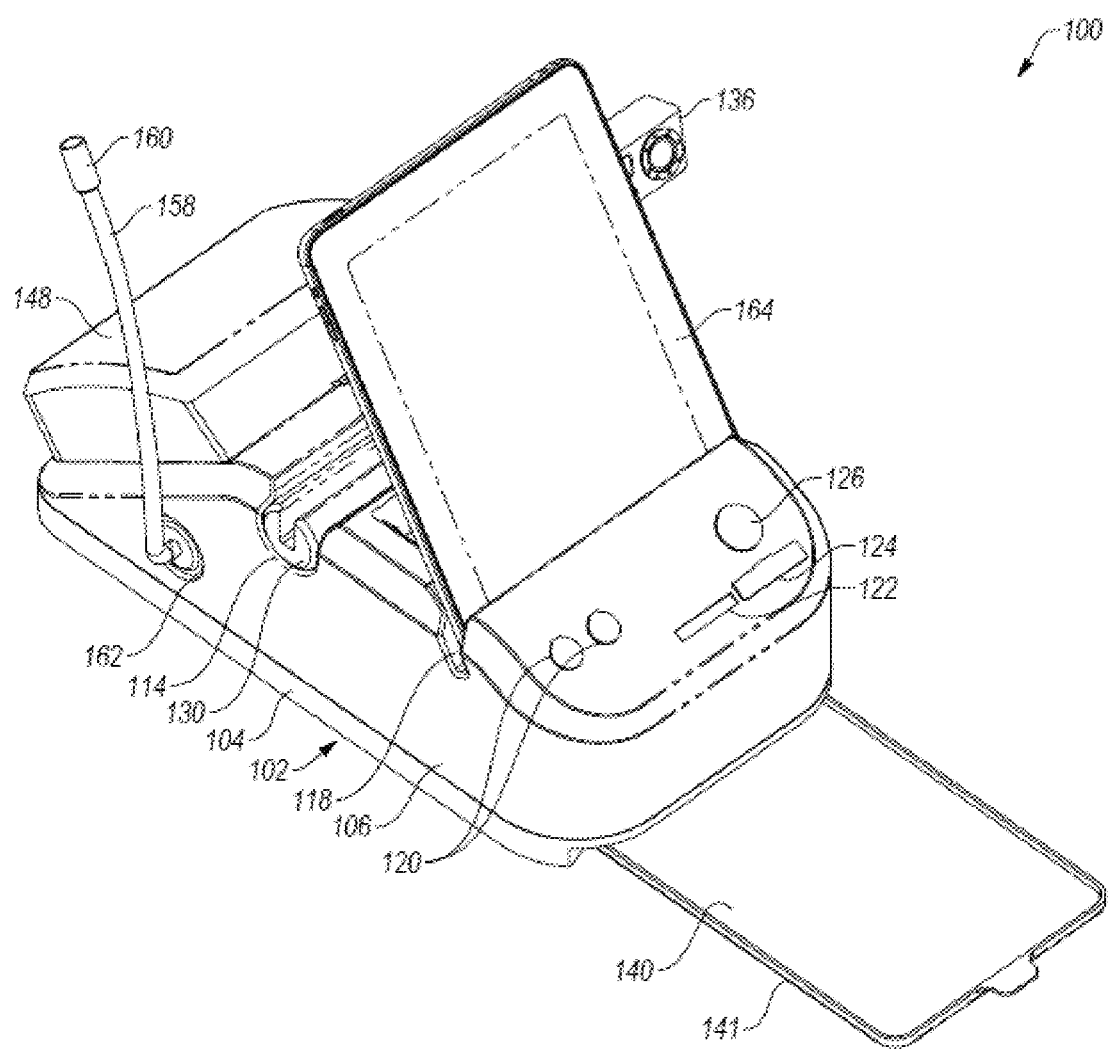
FIG. 3 presents a top front perspective view illustrating the portable power supply device shown in a first configuration in which a tablet is docked in a front device slot, the tray is extended and the light mount arm and the camera mount arm are elevated in typical application of the device.

In some embodiments, a device slot 118 may extend into the top housing portion 106. The device slot 118 may extend in transverse relationship to the longitudinal axis of the device housing 102. As illustrated in FIG. 3, in typical application of the portable power supply device 100, the device 164 can be inserted in the device slot 118 such that the device slot 118 supports the device 164 at a fixed angle for viewing. In the present embodiment, the device slot 118 is tilted rearward, toward a rear end of the device housing 102 at which the DC/AC inverter 142 is located. Such rearward tilting allows the device 164 to adopt a position within the device slot 118 such that the device 164 is tilted upward as shown in FIG. 3, facilitating viewing information on a screen of the device 164 by a user standing or sitting in front of the portable power supply device 100.

As illustrated in FIG. 1, in some embodiments, a pair of defibrillator connector ports 120 may be provided in the top housing portion 106. Optionally, each defibrillator connector port 120 may have a cover as shown, such as a rubber cover to keep out environmental contaminants, which may be removable or flaps as shown. Each defibrillator connector port 120 may be disposed in electrical contact with the battery or batteries 138, preferably through and/or operable by the controller 166 inside the device housing 102. Each defibrillator connector port 120 may be suitably adapted to accept a cable connector 156 which terminates one end of a defibrillator cable 152. A defibrillator pad 154 may terminate the opposite end of the defibrillator cable 152. Accordingly, in some applications of the portable power supply device 100, the defibrillator pads 154 may be placed against the chest of a patient to defibrillate the patient's heart. Electrical current from the battery or batteries 138 inside the device housing 102 flows through the defibrillator cables 152 to the defibrillator pads 154 and onto the patient's chest. In embodiments having more than one battery 138, the defibrillator connector port or ports 120 may receive electrical current from only one specific battery 138, such as the battery 138 capable of delivering the highest peak current. The portable power supply device 100 can further include sensors to detect when the cable connectors 156 have been inserted in the defibrillator connector ports 120 and readjust the electrical circuitry of the controller 166 so that power is fed to the defibrillator connector ports 120 from one specific battery 138. The controller 166 can function as such a sensor when electrical current is being drawn through the defibrillator connector ports 120. In embodiments in which the multiple batteries 138 are connected in parallel, the defibrillator connector ports 120 may receive electrical current from parallel-connected batteries 138.

In one embodiment, a kit includes the device 100 and the defibrillators having the defibrillator cable connecting the pad 154 with connectors 156.

In some embodiments, a battery level indicator 122 may be provided on the top housing portion 106 of the device housing 102, such as at a front end of the device housing 102 as shown in the drawings. The battery level indicator 122 may be electrically connected to the controller 166. Thus, the battery level indicator 122 may indicate the level of electrical charge which remains in the battery or batteries 138. For instance and without limitation, the battery level indicator 122 can include a set of LEDs, where the number of LEDs illuminating is dependent on the remaining battery charge. Otherwise, the battery level indicator 122 can be any type of display screen that can display battery level indicator information.

In some embodiments, at least one USB charging port 124 may be provided on the top housing portion 106. The USB charging port or ports 124 may be electrically connected to the controller 166. Accordingly, an electronic device (not illustrated) which is in need of electrical charging may be connected to a USB charging port 124 through a cable (not illustrated) fitted with a USB connector (not illustrated), typically in the conventional manner. Optionally, each USB charging port 124 may have a cover as shown, such as a rubber cover to keep out environmental contaminants, which may be removable or flaps as shown.

At least one DC outlet 126 may be provided in the device housing 102 and electrically connected to the controller 166. The DC outlet 126 may provide DC voltage and current from the battery or batteries 138 to an external device (not illustrated) connected to the DC outlet 126. In some applications, the DC outlet 126 can be used as a charging inlet to facilitate charging of the battery or batteries 138 from an external source (not illustrated) connected to the DC outlet 126. For instance and without limitation, the DC outlet can be a female cigarette lighter socket as known in the art. Optionally, each DC outlet 126 may have a cover as shown, such as a rubber cover to keep out environmental contaminants, which may be removable or flaps as shown. Additionally, a kit may include a connector having a male DC plug on each end so as to be electronically coupled with the DC outlet 126 to another DC outlet on a vehicle or elsewhere.

As illustrated in FIGS. 1 and 2, a camera mount opening 128 may be provided in the top housing portion 106 of the device housing 102. The camera mount opening 128 may be suitably sized and configured to accept a companion camera mount arm 134. In some embodiments, such as the embodiment depicted herein, the camera mount arm 134 may pivotally engage the camera mount opening 128. Additionally or alternatively, the camera mount arm 134 can be flexible and deformable, in a gooseneck fashion. A camera 136, such as a still picture and/or video camera 136, which may be conventional, may be removably mounted on the camera mount arm 134 such as by a male-female threaded connection, a male portion of which is provided on a distal end of the camera mount arm 134 and a female portion of which is provided on the video camera 136. Thus, in some applications of the portable power supply device 100, the camera 136 can be assembled onto the camera mount arm 136 and can be operated to record medical or dental procedures or the like which are carried out adjacent to the portable power supply device 100.

In one embodiment, the camera 136 is integrated with the camera mount arm 134 such that the camera mount arm 134 has electrical connections that run from the camera 134 to the controller 166. In one embodiment, a kit can include the device 100 and a camera.

As illustrated in FIGS. 1 through 3, a light mount opening 162 (FIG. 3) may be provided in the top housing portion 106 of the device housing 102. The light mount opening 162 may be suitably sized and configured to accept a companion light mount arm 158. In some embodiments, such as the embodiment depicted herein, the light mount arm 158 may pivotally engage the light mount opening 162. Additionally or alternatively, the light mount arm 158 can be flexible and deformable, in a gooseneck fashion. A light 160, which may be conventional, may be mounted on the light mount arm 158; however, the light 160 may be removably coupled with the light mount arm 158 or affixed or integrated therewith. Thus, in some applications of the portable power supply device 100, the light 160 can be operated to illuminate the area in which the medical or dental procedure or the like is carried out adjacent to the portable power supply device 100. Preferably, the light 160 is non-removably affixed to the light mount arm 158 and forms an integral part of the portable power supply device 100. However, alternative embodiments are contemplated in which the light 160 is removably connected to the light mount arm 158 such as by a threaded or magnetic attachment. In some embodiments, the light 160 is rotatably connected to the light mount arm 158 such as by a ball joint fastener, allowing the user to readjust the orientation of the light.

In one embodiment, a kit can include the device 100 and one or more lights 160 that can be mounted to the light mount arm 158. In some instances, the one or more lights 160 may include at least two different types of lights that emit different wavelength profiles, such as any distinct color: white, red, orange, yellow, green, blue, indigo, violet, or combinations thereof; as well as infrared, near infrared, ultra violet, and near ultraviolet. In one aspect, the light 160 may be a multi-colored light that can change color when instructed by a user via the controller 166. The user may input into the device 100 the desired color, and upon receiving the instruction the light 160 can emit the desired wavelength or combinations of wavelengths.

As described, in typical application, the portable power supply device 100 can be used by medical professionals, veterinarians, electronics technicians or other persons having to carry out and document complex manual procedures.

For example and without limitation, in FIG. 3 the portable power supply device 100 is configured to assist a user in carrying out a surgical procedure. Accordingly, a device 164 such as a tablet or any other portable computing device can be inserted in the device slot 118 in the top housing portion 106 of the device housing 102. The device slot 118 holds the device 164 at a fixed angle relative to the user as the user carries out the procedure. The user can view a video or read text which is presented on the device 164 and relevant to the procedure. Alternatively, the device 164 could be placed in the roller slot 132 of the device support roller 130, which supports the device 164 at a selected angle, as illustrated in FIGS. 4 and 5. In turn, the user has extended the tray 140 from the bottom housing portion 104 of the device housing 102 to place tools or other applicable items involved in the procedure. For instance, various surgical or dental tools (not illustrated) can be placed on the tray 140 for selection, retrieval and use by the user. The tray rim 141 may prevent the tools from inadvertently rolling or falling off the tray 140. The user has also readjusted and operated the light 160 to illuminate the portable power supply device 100 as well as impart additional illumination to the area in which the procedure is carried out. During the procedure, the user can readjust the position of the light 160 in order to illuminate objects placed on the tray 140, or any other spots if needed. The camera 136 has been placed on the camera mount arm 134 and is being operated to record the procedure. As illustrated in FIG. 2, in some applications, the inverter cover 148 can be removed from the DC/AC inverter 142. At least one electrical device (not illustrated) which operates using AC current can be plugged into the AC socket or sockets 144. The DC/AC inverter 142 converts the DC current from the battery or batteries 138 into AC current for operation of the electrical device. In some embodiments, the inverter cover 148 can optionally include one or more openings (not shown) with or without closable covers for providing direct access to the corresponding one or more AC sockets 144 without having to remove the inverter cover 148. In some instances, the inverter cover 148 is integrated with the housing 102. In some applications, the defibrillator cables 152 (FIG. 1) can be connected to the defibrillator connector ports 120 in the device housing 102. The defibrillator pads 154 can be applied against the skin on the chest of a patient (not illustrated) to defibrillate the patient's heart. In some applications, an electronic device (not illustrated) which is in need of electrical charging may be connected to the USB charging port 124 through a cable (not illustrated) fitted with a USB connector (not illustrated), typically in the conventional manner. In turn, the DC outlet 126 may provide DC voltage and current from the battery or batteries 138 to an external device (not illustrated) connected to the DC outlet 126. In some applications, the DC outlet 126 can be used as a charging inlet to facilitate charging of the battery or batteries 138 from an external source (not illustrated) connected to the DC outlet 126.

The illustrations of FIGS. 4 and 5 show an alternative use of the portable power supply device 100. As shown, an electronic device 164 such as a tablet has been placed in the roller slot 132 of the device support roller 130 with a device video camera (not shown) facing rearward, i.e., toward the rear end of the device at which the DC/AC inverter 142 is located. In turn, the light mount arm 158 has been pivoted to an elevated position in order for the light 160 to illuminate an area behind the device, i.e. facing the rear end of the device. Thus, the electronic device 164 and light 160 can be used to record a procedure being carried out next to the portable power supply device 100. By adjusting the tilting angle of the electronic device 164 (by rotating the roller cradle 130 to a different discrete stop) and the angle of the light mount arm 158 (about the rotation axis provided at the light mount opening 162), the user can record procedures taking place closer or farther apart from the portable power supply device 100.

FIG. 8 also shows that the device 100 may include a pair of electrical terminals 240 with one marked positive 242 (or red) and one marked negative 244 (or black). The pair of electrical terminals 240 may be posts or protrusions that can be coupled with positive and negative clamps of standard jumper cables so that the other end of the jumper cables can be clamped onto an external battery, such as a car battery, to recharge the external battery or use the external battery to recharge the one or more batteries of the device. The pair of electrical terminals 240 may be a custom close configuration so that a connector having positive and negative recesses 250 can be connected thereto, where the connector may have a cord extending therefrom with standard positive (red) and negative (black) clamps (e.g., similar to jumper cable clamps).

Figure 9A:
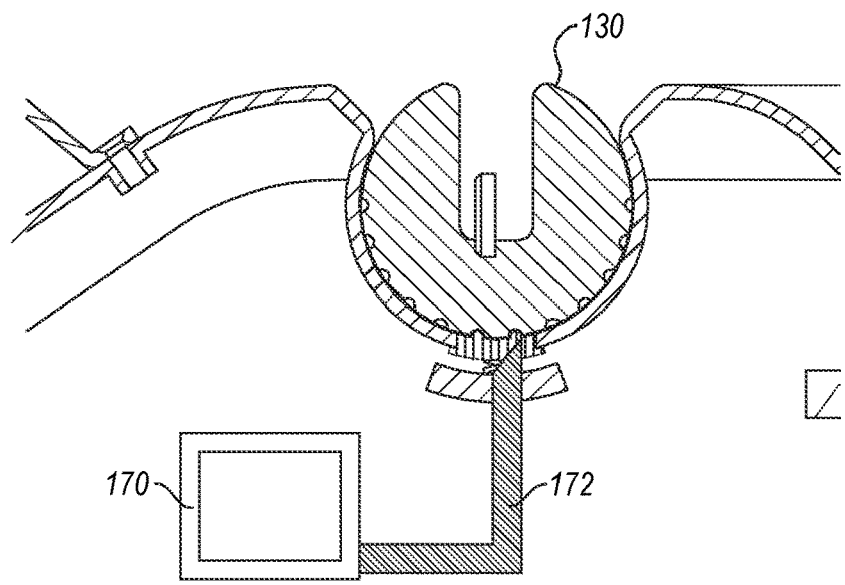
FIG. 9A represents a portion of the portable power supply device showing the support roller having a release mechanism.
Figure 9B:
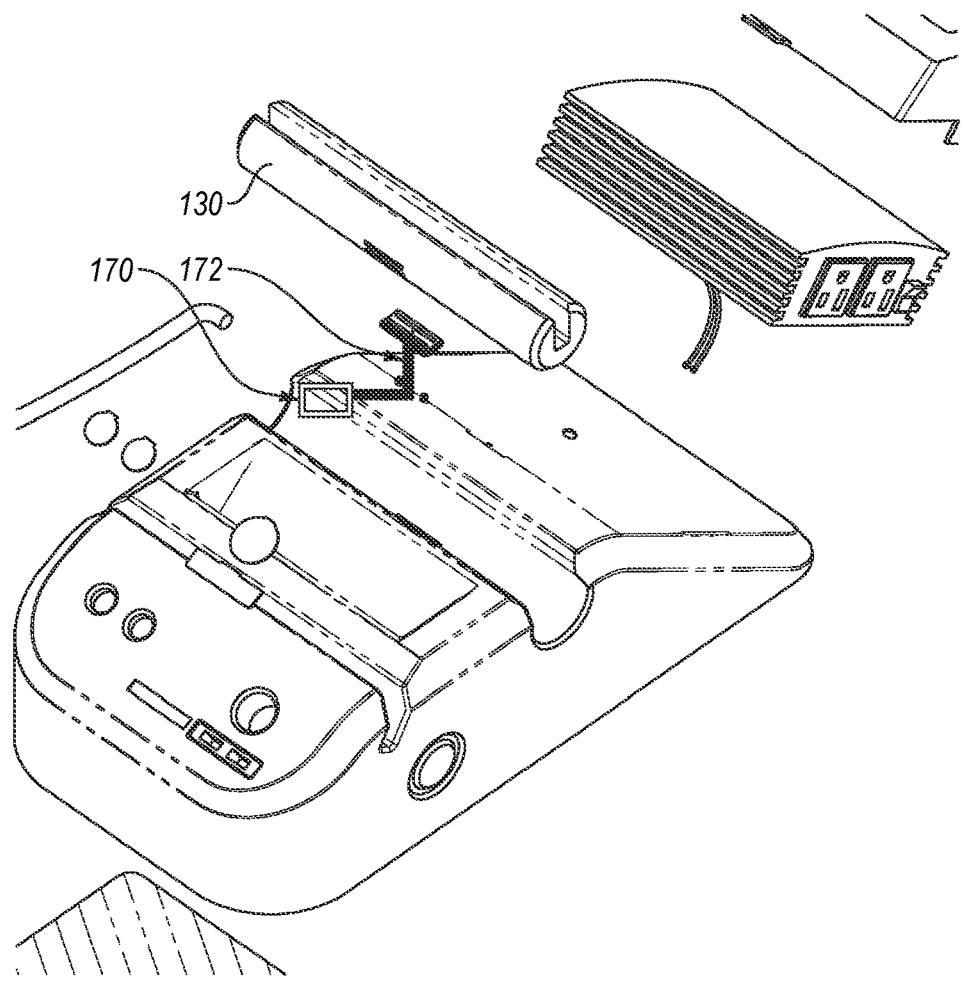
FIG. 9B shows an embodiment of the support roller and release mechanism with respect to the portable power supply device.

In one embodiment, the support roller 130 may be removable from the device housing 102. As such, FIG. 1 shows the device housing 102 includes a release mechanism 170, which can be in the form of a button. The release mechanism 170 when actuated can cause the support roller 130 to be removable from the device housing 102. The release mechanism 170 may be located anywhere on the device housing 102; however, it may be helpful to have the release mechanism 170 proximal or adjacent to the support roller 130. As shown, the release mechanism 170 may be located on the side or alternatively located on the top as shown by release mechanism 170a. As shown in FIGS. 9A-9B, the roller cradle 114 may be provided in the top housing portion 106 of the device housing 102. The roller cradle 114 may extend in transverse relationship to the longitudinal axis of the device housing 102. The roller cradle 114 can include a bottom insert providing one or more transverse ridges 115. The support roller 130 may be disposed for rotation inside the roller cradle 114 about a central axis of the device support roller 130, the central axis being arranged transversely to the longitudinal direction of the device housing 102. Actuation of the release mechanism 170 can cause a coupler mechanism 172 that is connected to the transverse ridges 115 to disengage from the bottom ridges 133 of the support roller 130. When the transverse ridges 115 are engaged with the bottom ridges 133, the support roller 130 is engaged with the roller cradle 114, but when the release mechanism 170 is actuated, the coupler mechanism 172 pulls the transverse ridges 115 from the bottom ridges 133, which allows for the support roller 130 to be withdrawn from the roller cradle 114. The coupler mechanism 172 can include components known in the art for engagement and disengagement of components.

Figure 9C:
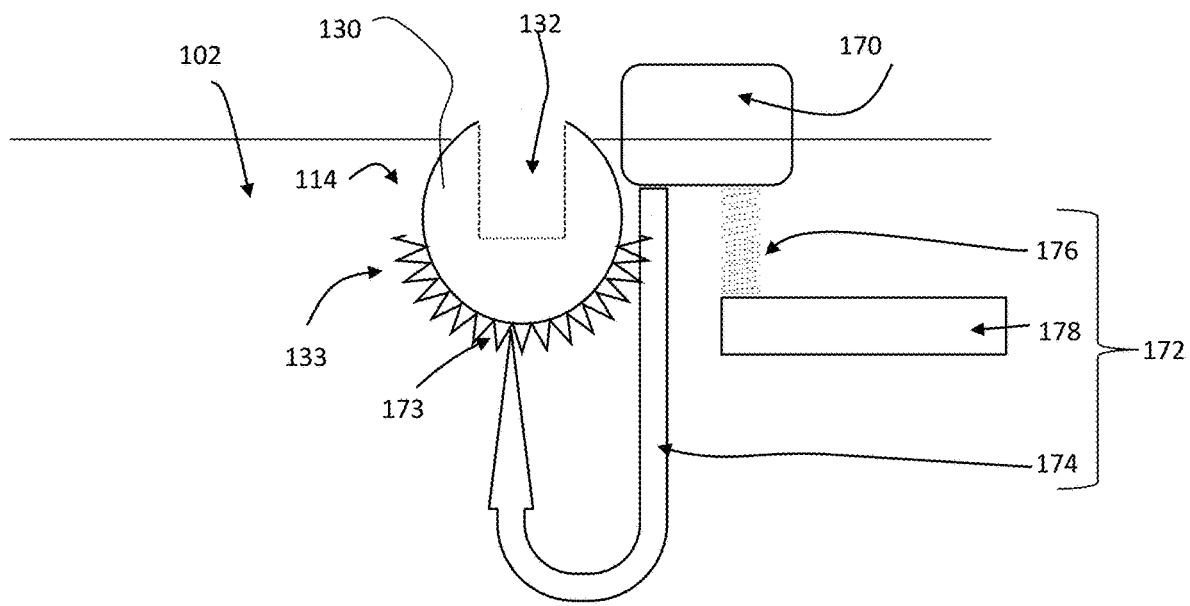
FIG. 9C shows the support roller engaged with the portable power supply device with the release mechanism engaged.
Figure 9D:
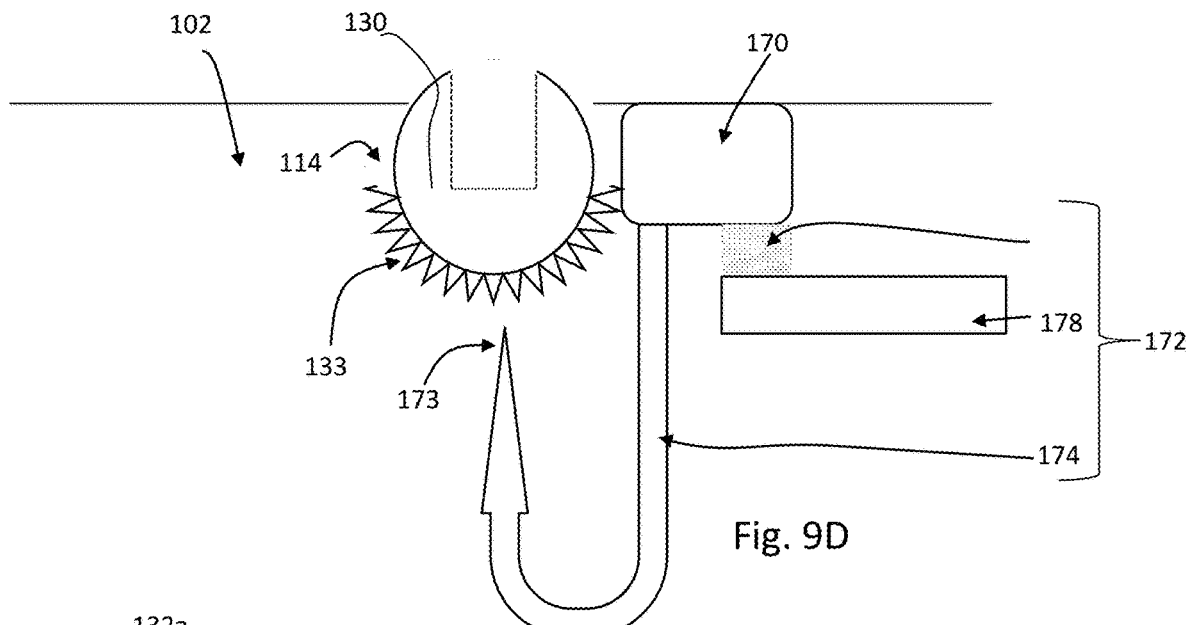
FIG. 9D shows the support roller engaged with the portable power supply device with the release mechanism disengaged.

FIGS. 9C and 9D show when the support roller 130 is engaged in the roller cradle 114 when the release mechanism 170 and coupler mechanism 172 are engaged (FIG. 9C) or disengaged (FIG. 9D) to allow withdrawal of the support roller 130 from the roller cradle 114. Upon disengagement, the support roller 130 can be slid out from the roller cradle 114. As shown, the release mechanism 170 is adapted as a push button that is coupled to a coupler 174 and biased by a biasing member 176 (e.g., spring) that is biased against a structural member 178 (e.g., part of housing 102 or other part of device). Here, the coupler 174 is shown with a catch 173, which may have one or more tines (e.g., one tine shown) that can engage in the recesses of the bottom ridges 133 as shown in FIG. 9C to retain the support roller 130 in the roller cradle 114, and then can be withdrawn from the recesses of the bottom ridges 133 to allow for withdrawal of the support roller 130 from the roller cradle 114. However, other engagement/disengagement configurations may be used.

Figure 9E:
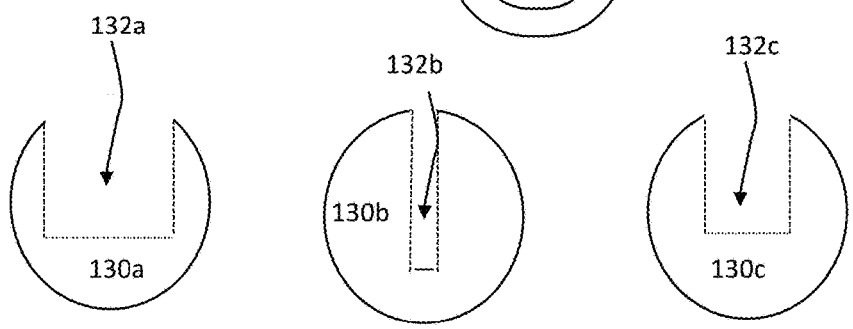
FIG. 9E shows different embodiments of support rollers having different slot dimensions.

In one embodiment, the present invention can include a kit that has the portable power supply device 100 with one or more removable support rollers 130, such as rollers 130a, 130b, and 130c of FIG. 9E. As shown, the elongate roller slots 132a, 132b, and 132c have different dimensions. As occurs with changes in technologies, tablet computers may change in dimensions. As such, the support rollers 130 may be exchanged with one that has a roller slot 132 that fits the current device. Accordingly, a kit may include two or more support rollers 130 with different dimensioned roller slots 132. Alternatively, only one roller support 130 may be included with a portable power supply device 100, and upgraded or different support rollers 130 may be purchased and used with the portable power supply device 100. Also, the different support rollers 130 may have different electrical connectors, such as different sized USB, mini USB, micro USB, a firewire connector, lightening connector, Google connector, or other electrical connector. In some instances, the roller slots 132 may be adapted with a dimension and electrical adapter 220 that fits with their device. This allows a consumer to obtain the support roller 130 that fits and connects to their tablet computer.

Figures 9F, 9G:
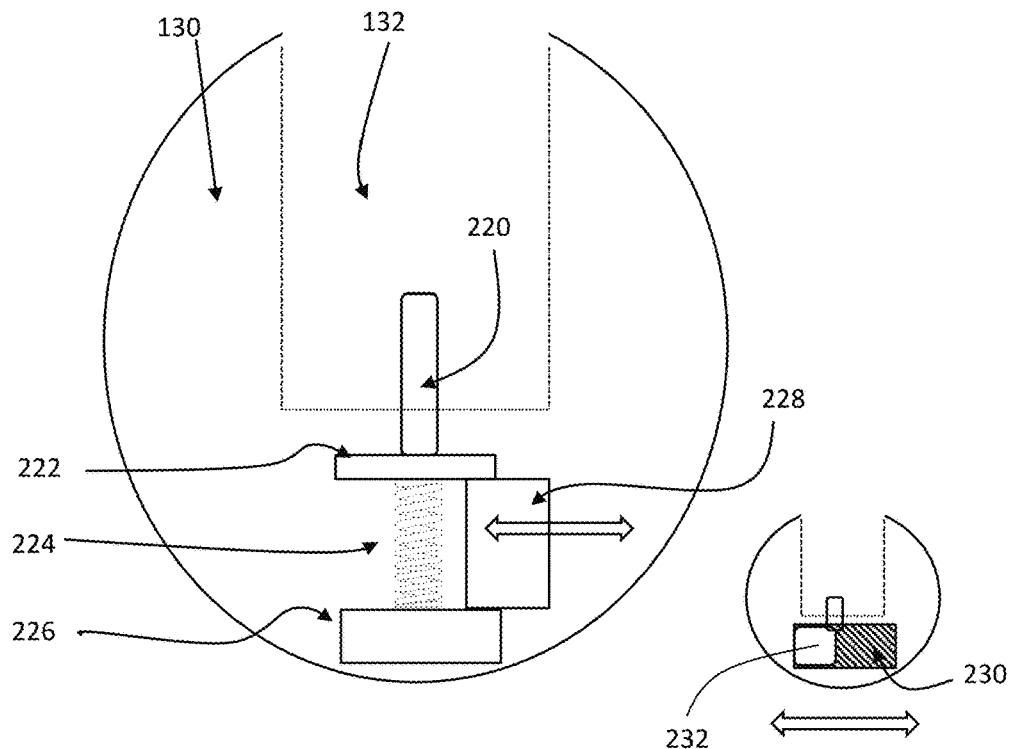
FIG. 9F shows an embodiment of a retractable mechanism for a retractable electrical adapter in a slot of a support roller, where the retractable mechanism is engaged so that the electrical adapter is not retractable.
FIG. 9G shows a switch for the retractable mechanism being in the engaged position.
Figures 9H, 9I:
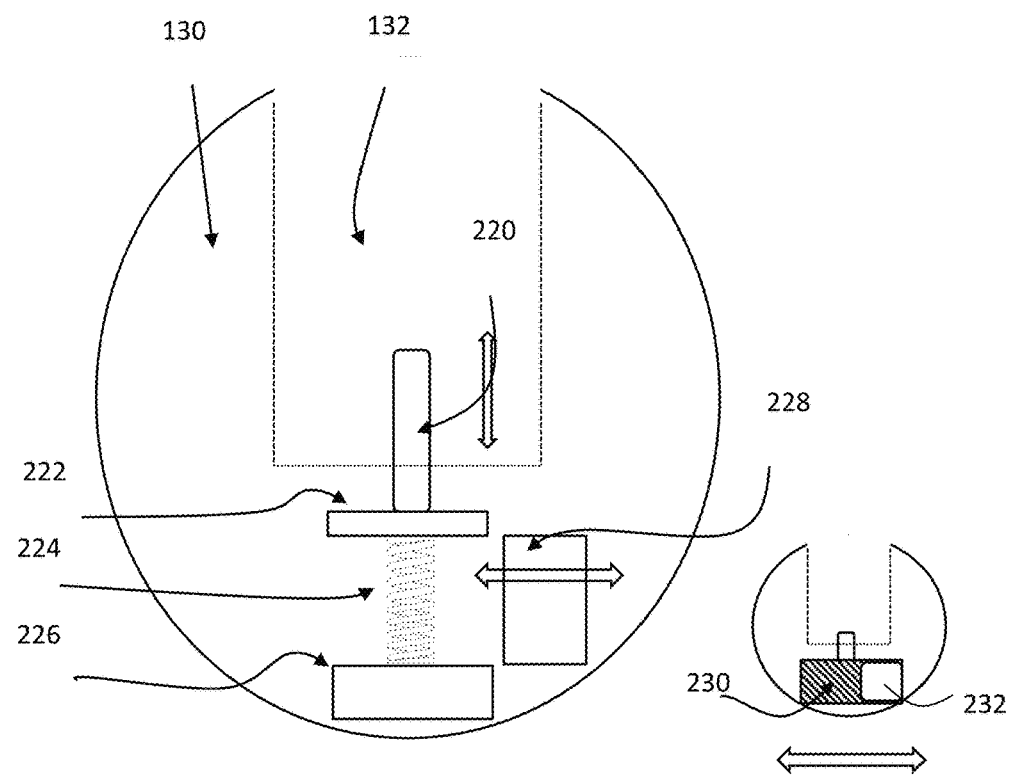
FIG. 9H shows an embodiment of a retractable mechanism for a retractable electrical adapter in a slot of a support roller, where the retractable mechanism is disengaged so that the electrical adapter is retractable.
FIG. 9I shows a switch for the retractable mechanism being in the disengaged position.

In one embodiment, the electrical adapter 220 in the roller slot 132 of the support roller 130 may be retractable, such as being selectively retractable. FIGS. 9F, 9G, 9H, and 9I show a configuration that allows for such selective retractability of the electrical adapter 220 in the roller slot 132; however, other configurations that allow for selective retractability can be provided. As shown, the electrical adapter 220 that is in the roller slot 132 may be connected to a base 222, which base 222 is biased by a spring 224 or other biasing element against a structural member 226, such as a part of the housing 102 or other part of the device. FIG. 9F shows a block 228 between the base 222 and structural member 226 so that the electrical adapter 220 is not in a retractable configuration. Correspondingly, the block 228 may be operably coupled to a switch 232 in a switch receiver 230, where sliding the switch 232 in one direction releases the block 228 and sliding in the other engages the block 228. FIG. 9G shows that when the switch 232 is on the left, the block 228 is engaged and prevents the electrical adapter 220 from being retractable as the base 222 cannot force the spring 224 due to the block. However, when the switch 232 is switched, as shown in FIG. 9I (e.g., to the right), the block 228 becomes disengaged to allow the spring 224 to then be compressed so that the electrical adapter 220 becomes retractable as shown in FIG. 9H. It should be recognized that this configuration is one embodiment and there are other options to make the electrical adapter retractable. Having the electrical adapter 220 being selectively retractable can be advantageous by selecting the electrical adapter 220 to be exposed so that it can fit into a first tablet, and then when a new tablet is used or needed that does not have a connector for the specific electrical adapter 220, the switch 232 can be switched so that the electrical adapter 220 can be retracted so that the new tablet can fit into the roller slot 132.

Figure 10:
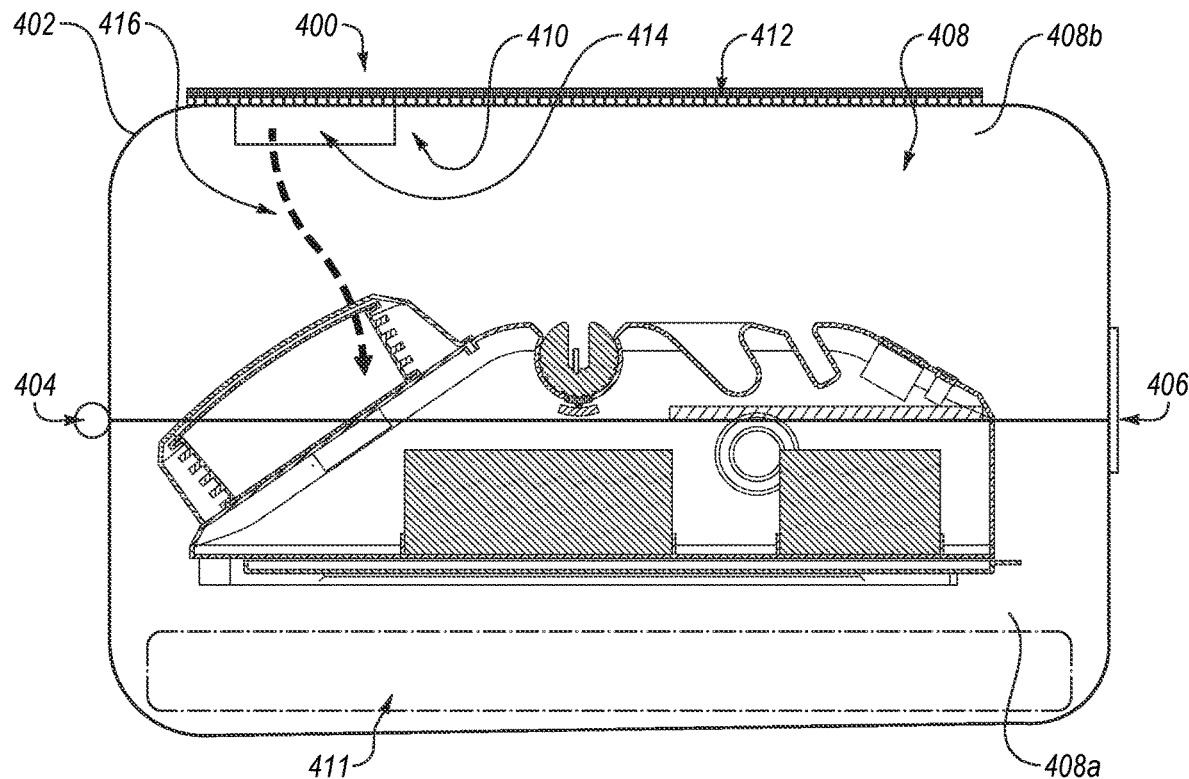
FIG. 10 shows a carrying case for the portable power supply device.

In one embodiment, the portable power supply device 100 can be provided in a custom carrying case 400, which is shown in FIG. 10. The custom carrying case 400 can include a shell 402 that has a hinge 404 and a latch 406, which can be standard for carrying cases, such as brief cases. The carrying case 400 may include an insert 408 that is contoured to the housing 102 so that the portable power supply device 100 is snuggly fit into the carrying case 400. The insert 408 may include a bottom insert 408a that contours the bottom of the device 100, and a top insert 408b that contours the top of the device 100. This operates as a clam-shell case so that the device 100 can be protected during portability.

FIG. 10 also includes a solar panel system 410 that includes a solar panel 412 and solar panel electronic module 414 that is connected to the device 100 via a charging cord 416 (dashed line), which allows for charging of the batteries in the device 100.

Figure 11:
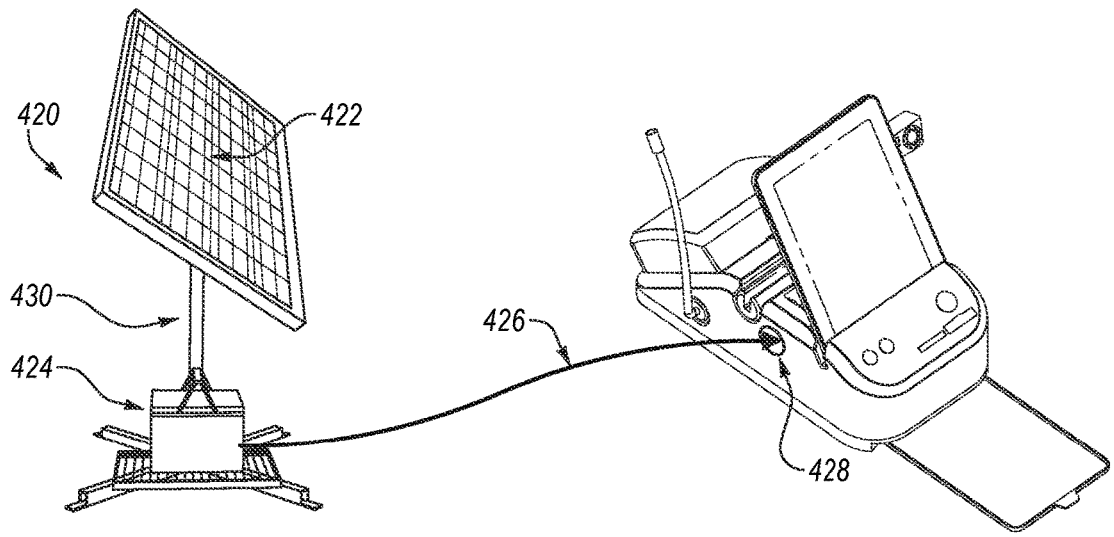
FIG. 11 shows a solar panel system for charging the portable power supply device.

FIG. 11 shows a system 420 that includes a portable solar panel 422 with a solar panel electronic module 424 having a charging cord 426 that can be plugged into a solar panel charge port 428 of the device 100. The charging cord 426 can be of sufficient length that the solar panel 422 may be placed outside and be connected to the device 100, such as 15 meters, 20 meter, 25 meters, 50 meters, 100 meters, or more. The solar panel 422 can have any number of panels, which may be connected to each other and foldable. The solar panel 422 is connected to a mount pole 430 that is attached to a base 432 to allow for the solar panel to be free standing.

Figure 11A:
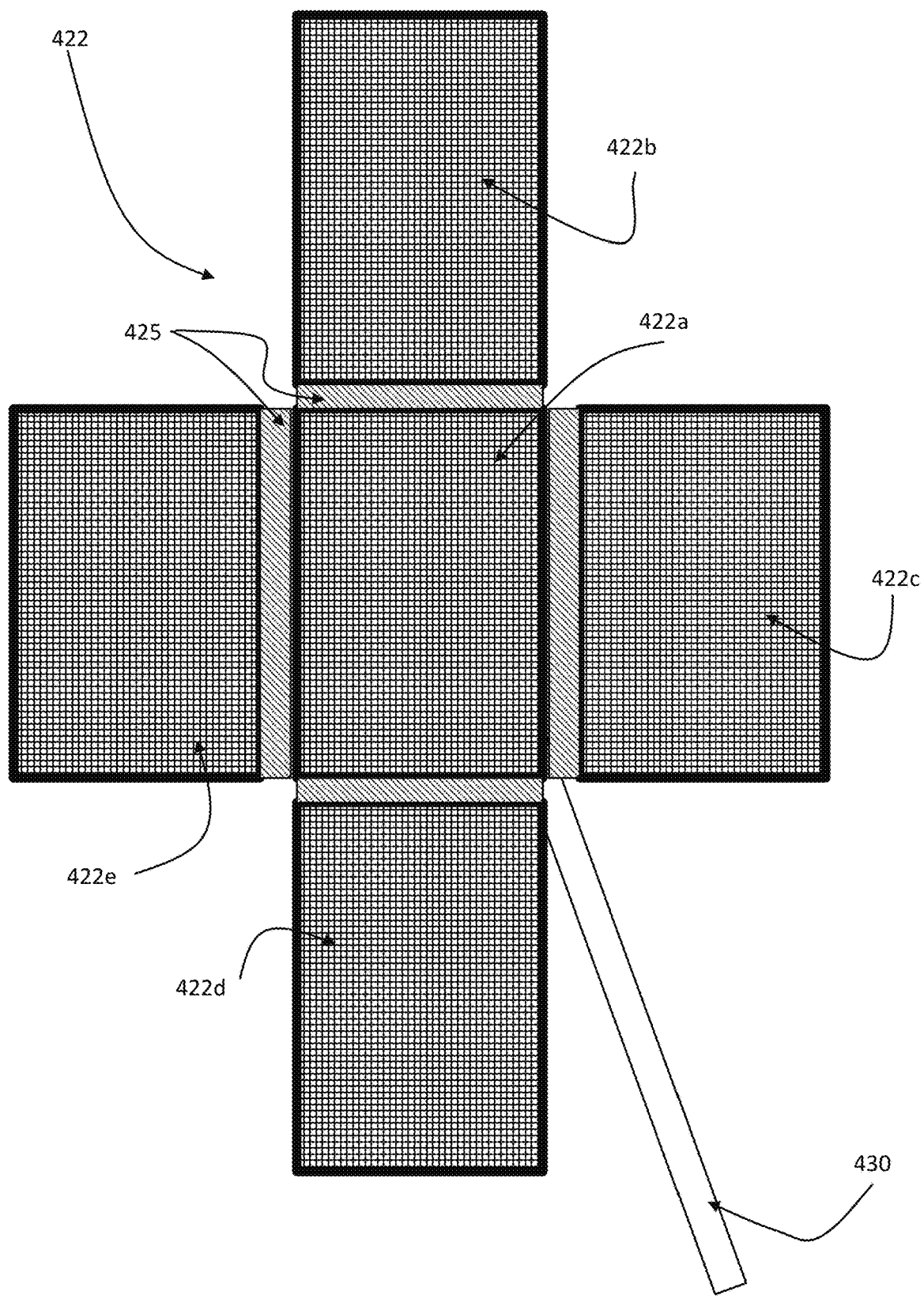
FIG. 11A shows a foldable solar panel array.

FIG. 11A shows another embodiment of a solar panel 422, which includes five individual panels 422a, 422b, 422c, 422d, 422e, which are connected via hinges 425. This allows the panels to fold up to be the footprint of a single individual panel. The solar panel system 422 may include a carrying case, such as shown in FIG. 10, which is adapted to carry the solar panel 422 and associated solar panel system. Alternatively, the carrying case 400 for the device 100 of FIG. 10 may include a compartment 411 that is adapted to carry the solar panel system. While five panels are shown, any number, such as 2, 3, 4, 5, 6, 7, 8, 9, 10 or more can be connected together, and foldable. In one aspect, a kit can have 1, 2, 3, 4, 5, 6, 7, 8, 9, 10, or more separate solar panels that each can individually be connected to the device 100. In one aspect, the device can include a plug port for each solar panel, such as described herein.

In one aspect, the solar panel system can be rotatable so that the solar panel can rotate with the sun. As such, the solar panel system can include a motor with a movable mechanism attached to the pole and solar panel. Also, the solar panel system can include a photodetector that detects the direction of the sun, so that the solar panel system can rotate the solar panel to face the sun for higher solar power gains.

In one embodiment, the one or more batteries of the device 100 may be increased in capacity, which may result in over 300 watts of power, such as 400-600, 500-600, or up to 600 watts of power. In one aspect, the batteries may be in serial connection, or they may be separate. In one aspect, each battery has its own charging port in order to charge the specific battery, or a single charging port can be configured to charge all of the batteries with the proper onboard charging system components. In one aspect, each battery may have an outlet power port to provide power to a component. These adaptations may be made by one of ordinary skill in the art. In one aspect, two or more of the batteries are not in parallel connection. In one aspect, there are four batteries in serial connection to obtain the power described herein. In one aspect, the batteries are lithium ion, or can be any other type of battery.

In one embodiment, the solar panel system is connected to the batteries in the device. In one aspect, the solar panel system is connected to four batteries that are in serial connection within the device.

Figure 12:
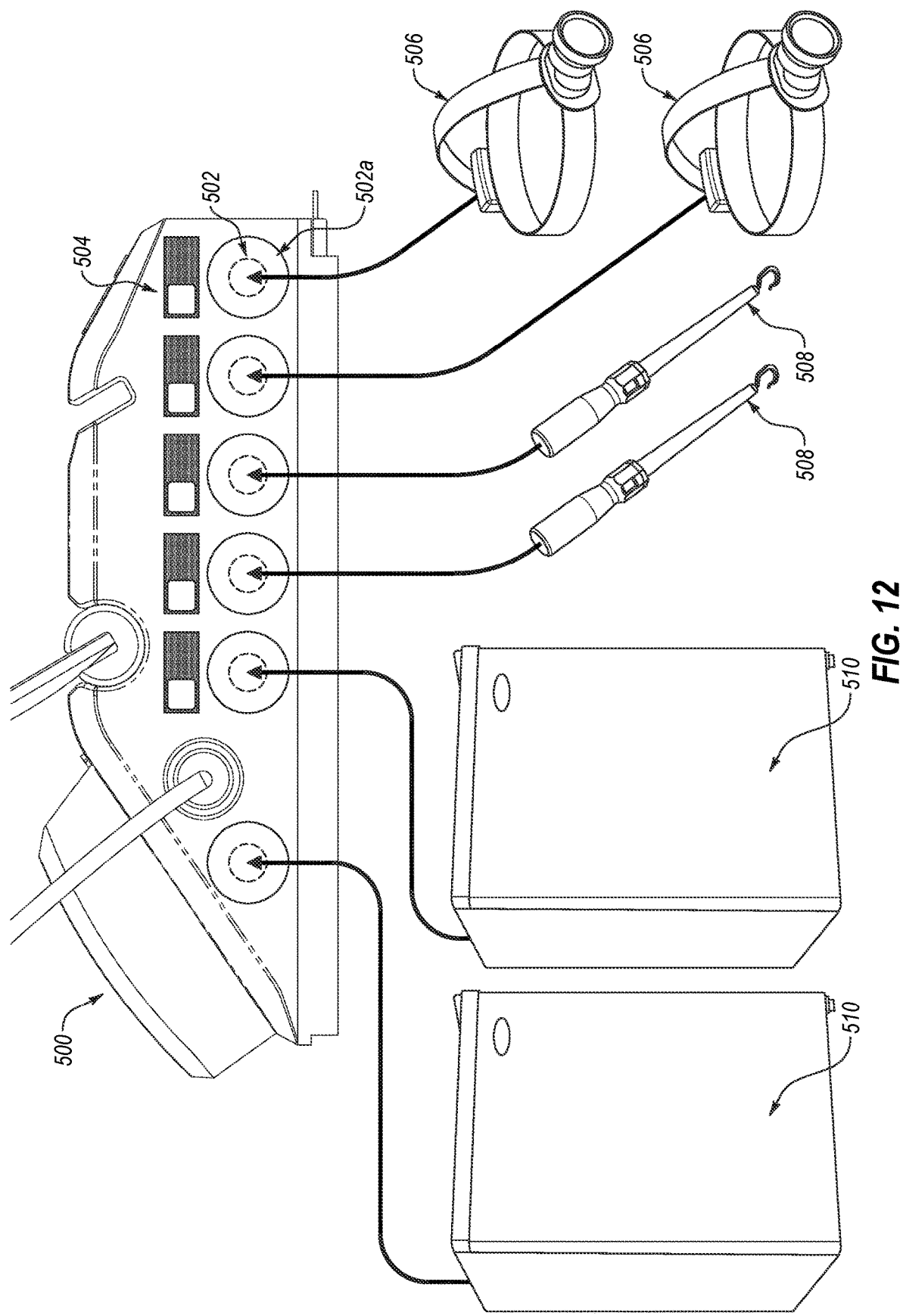
FIG. 12 shows a portable power supply system having a portable power supply device and additional components, such as headlamps, light sticks, and refrigerators (thermoelectric coolers).

FIG. 12 shows a portable power supply system 500 that includes a portable power supply device 100 having a plurality of power ports 502. Each power port may be associated with a power switch 504 that turns the associated power port 502 on or off. Each power port may be adapted to power a certain component of the system 500. As shown, the system 500 includes two headlamps 506 (e.g., LED headlamps with wearable strapping), two light sticks 508 (e.g., LED light sticks, with optional handle, optional on/off switch, and optional hanging hook), and two refrigerators 510. However, any number of these components or other components may be included, such as the components described herein, such as camera(s) (video or still), lights, or the like. The headlamps 506 can be helpful for performing procedures in the dark and allow the practitioner to be hands free. The light sticks 508 may also provide lighting. The refrigerator may be used to keep drugs, medical supplies, ice packs, cold packs, or other things at cool temperatures.

Figure 12A:
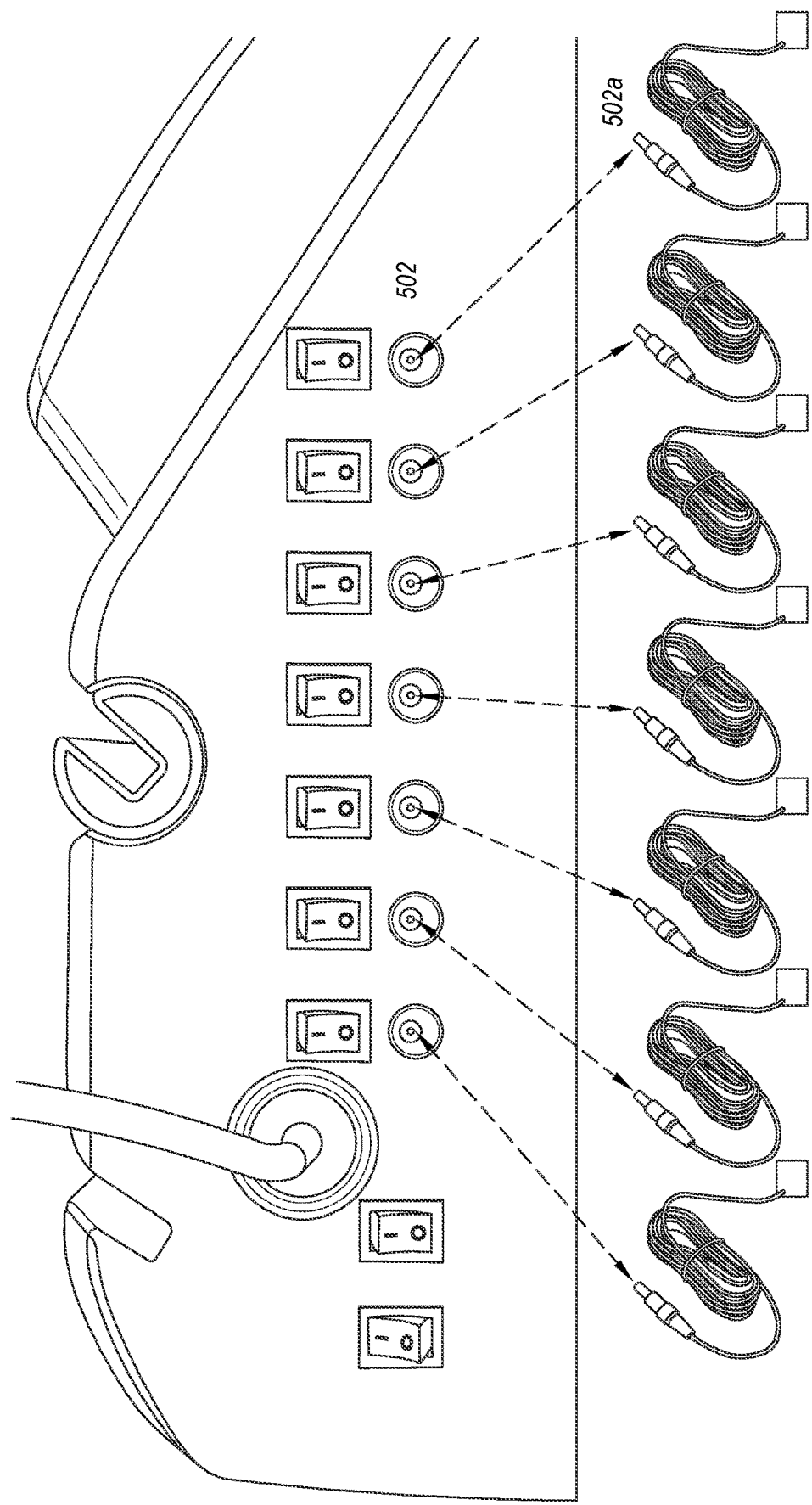
FIG. 12A shows the portable power supply system with the portable power supply device having a plurality of color coded ports that match color coded plugs, and with switches for activating or deactivating the individual ports.
Figure 13:
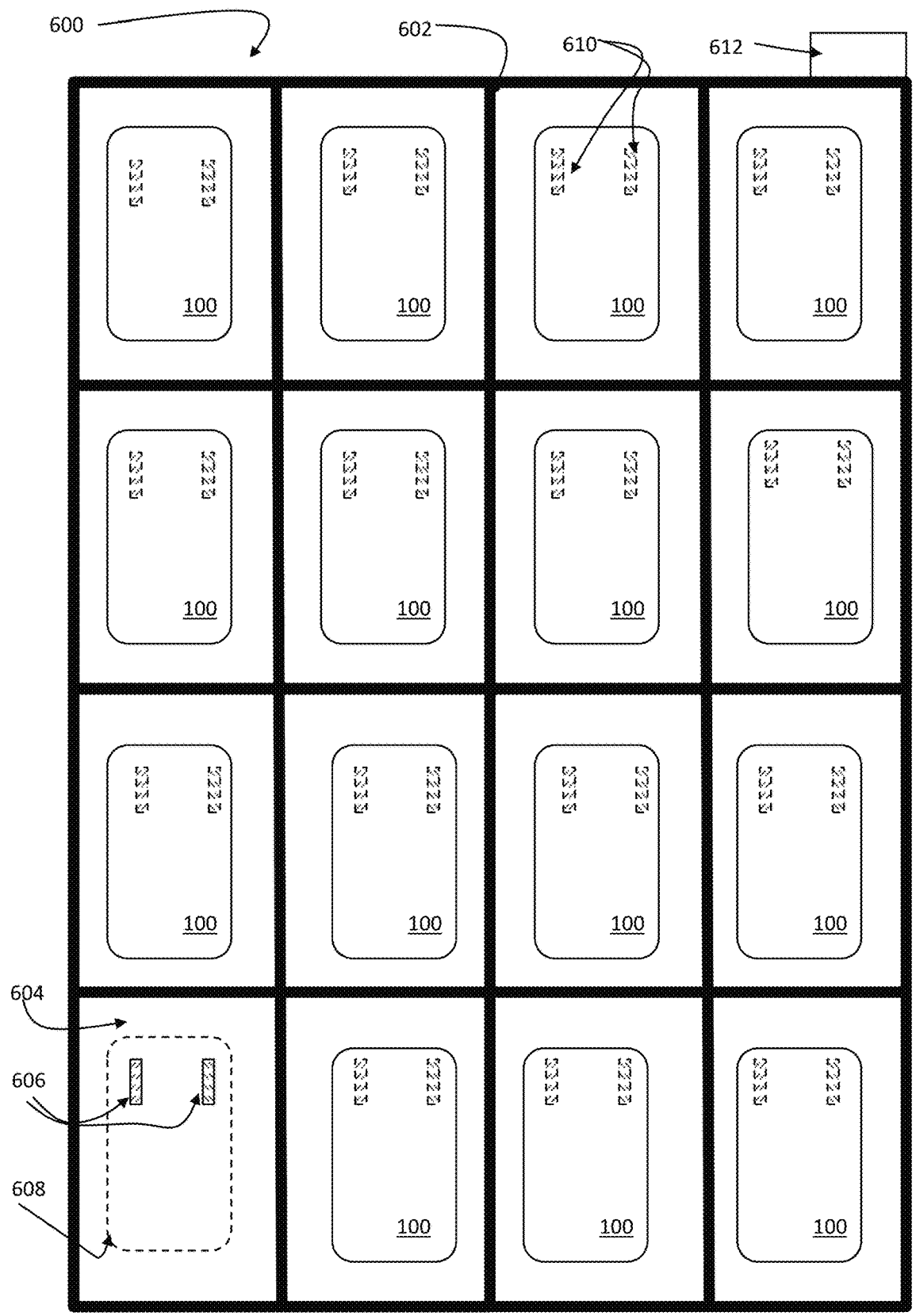
FIG. 13 shows a charging grid that can charge a plurality of portable power supply devices.

In one embodiment, each of the power ports 502 may be color coded or pattern coded for a specific plug or plug for a specific component. For example, the different power ports 502 may include one each of: red, orange, yellow, green, blue, indigo, violet, black, white, striped, checkered, or any color combination or any pattern color combination. Here, the port 502 and the plug 502a may have the same color/pattern as identified by the dashed arrows therebetween in FIG. 12A. Each of the plugs 502a include cords that plug into one of the components of an embodiment of a power system described herein. The color/pattern coding allows for the proper cord to be plugged into the proper port so that electrical problems can be avoided, especially during an emergency in order to help avoid costly errors.

In one aspect, the light stick 508 can be an LED light, or any other type of light. In one aspect, the LED light can be a super bright LED, which each draw ⅓ of a watt of power and the light stick 508 would include 36 of such individual super bright LEDs. In one example, the light stick 508 can include 18 LEDs in two rows for a total of 36 LED lights. The 36 super bright LEDs consuming ⅓ of a watt of power combined consume 12 watts of power versus 40 watts of power for fluorescent lights. The light stick can have a hook or magnet for attachment during use.

In one aspect, the refrigerator 510 may be of any type; however, it may be beneficial to be a low power cooler. The refrigerator 510 can be a thermoelectric cooler that can reduce temperatures to be cooler than the outside or ambient conditions, but not as cold as a traditional cooler. The refrigerator 510 can use thermoelectric cooling down to about 52-55 degrees F. Such a refrigerator 510 may be able to retain drugs and other medical supplies at suitable conditions so that they can have some shelf life, such as up to 8 hours, or 3-4 hours. The thermoelectric cooler system is known in the art, and may be devoid of a compressor or refrigerant. However, a traditional refrigerator/freezer may be included with the kit and used with the device 100.

In one embodiment, a kit may include two or more separate devices 100.

In one embodiment, the housing of the device 100 is made from an impact resistant material, such as a plastic. In one aspect, the plastic is a composite that includes a resin that softens the PVS package so that the housing can be impact resistant without cracking.

In one embodiment, the device 100 can include micro ports 440 (FIG. 1), such as micro or mini USB ports. However, it is expected that new micro, mini, or other small form factor ports will be developed, and the device 100 can include any number of such micro ports 440.

In one embodiment, the present invention can include a charging system 600. The charging system 600 can be part of a kit with the device 100 and any other component included herein. The charging system 600 includes a charging grid 602 with a plurality of charging stations 604. Each charging station 604 has charging electrical contacts 606, which may be arranged in a receiver 608 to match with the device contacts 610 of each device 100. The bottom left charging station 604 is shown without the device 100 so that the contacts 606 can be observed. The receiver 608 is shown with a dashed line to illustrate that it may be shaped to receive the device 100 therein so that the charging electrical contacts 606 can match with the device contacts 610. In the other charging stations, the device 100 is shown with the device contacts 610 having the dashed line as they are on the bottom of the device 100 so as to be capable of contacting with the charging contacts 606 when the device is placed therein. While a charging grid 602 of 16 charging stations is shown, any number of charging stations may be included, such as 4, 6, 8, 10, 12, 14, 16, or more. The charging system 600 is shown to include a power supply 612, which can be a power utility, battery system, solar panel, or other power source that can be used to charge the devices 100.

A portable power supply device for use by medical professionals, veterinarians, electronics technicians or other persons in carrying out and documenting complex manual procedures includes a device housing, a controller in the device housing, at least one battery in the device housing and connected to the controller, and at least one electrical port for providing electrical power from the at least one battery to an external electrically-powered device. The portable power supply device further includes an extendable tray, which can adopt an extended position in which the tray protrudes outwardly from the device housing, and a retracted position in which the tray is concealed within the device housing. The portable power supply device can include at least one defibrillator connector port, a female DC outlet and/or a DC/AC inverter on the device housing and connected to the controller.

Thus, the portable power supply device 100 provides an extremely versatile equipment for carrying out complex manual procedures both indoors and outdoors, especially (but not only) procedures involving the use of electronic equipment.

In one aspect, the device further includes at least one defibrillator connector port on the device housing that is operably connected to the at least one battery. Preferably, two defibrillator connector ports are provided, which may be located on any position of the device. The defibrillator connector ports may be connected to one or more defibrillators. As such, the device may be used for defibrillation procedures.

In one aspect, the device further includes at least one female DC outlet on the device housing that is operably connected to the at least one battery. The female DC outlet may be located on any position of the device. The female DC outlet may have a male DC plug received therein, which male DC plug may be attached to a cord that extends to another female DC outlet or a male DC plug at the other end.

In one aspect, the device further includes a DC/AC inverter on or in the device housing that is operably connected to the at least one battery. The inverter may be located on an outer surface and protected by a cover, or it may be included within the housing. The inverter can include one or more standard electrical plugs. The inverter may have any wattage and any voltage, where 300 W and 12 volts are an example. However, depending on the number of batteries, the inverter can be up to 1000, 2000, 3000, 4000, or 5000 W, and/or may include 24 volts or 6 volts or other voltage (e.g., 28 voltage for specialty applications).

In one aspect, the device further includes a camera mount arm movably extended from the device housing having an end with a camera mount. The camera mount arm may have a camera mount at its ends opposite of the housing so as to be capable of mounting a camera thereto. Also, the camera mount may have an electrical port that can be electrically coupled with an electrical port of the camera, and thereby the camera mount arm may have an electrical connection to the battery and may be operated by the controller. The camera may also be integrated with the camera mount arm and electrically connected through to the battery and/or controller. The controller may be used to operate the camera. The camera may be a still picture camera and/or video camera and may record standard video with sound. The camera may also include a light to illuminate the subject matter being recorded. The camera may also include a display or optical lens that allows a user to accurately direct the camera to capture the desired image or video content.

In one aspect, the device further includes a light mount arm movably extended from the device housing and having an end with at least one light. The light may have one or more unique light emitters for emitting light of one or more colors from IR to UV and any visible or white color of light.

In one aspect, the device further includes a hand grip recess formed in the device housing for gripping and carrying the portable power supply device. The hand grip recess can be coated with a gripping coating that has high friction with skin. Any grip coating may be used. The hand grip recess may form an aperture so that the hand can encircle the grip for increased handling security.

In one aspect, the device further includes: a roller cradle formed in the device housing; and a device support roller having an elongated roller slot rotatably located in the roller cradle, the elongated roller slot being dimensioned to support an electronic device. The device support roller may include an electrical connection port at the base of the elongated roller slot, which may be a USB, micro USB, firewire, lighting port, Pixel port, or other electrical connection port that can be electronically coupled with an electronic device so that the electronic device can be powered and/or charged while in the elongated roller slot. One or more adapters (e.g., USB, micro USB, firewire, lighting port, Pixel port) for different electronic devices so that the electrical port can be adapted to fit into any electronic device electrical port.

In one aspect, the roller cradle and device support roller further comprising an angle selection mechanism that allows the rotational angle of the device support roller to be adjusted relative to the roller cradle. In one aspect, the angle selection mechanism includes a plurality of cradle ridges on the roller cradle and a plurality of roller ridges on the support roller, said cradle ridges and roller ridges being adapted to define set rotational angle positions of the device support roller relative to the roller cradle. In one aspect, the angle selection mechanism is a friction mechanism that frictionally engages the roller cradle with the device support roller at one or more defined angles.

In one aspect, the device further includes a battery level indicator on the device housing that is configured to indicate the level of electrical charge in the at least one battery. The battery level indicator can be simple such as multiple LED lights that indicate a power level or lights that change from green to red. Also, a display can include the battery level indicator as is common on electronic devices with battery level indicators.

In one aspect, the device further includes at least one USB connector port. The USB can be 1.0, 2.0, 3.0, or any standard as known or developed. The USB connector may include a USB cord connected thereto, where the other end of the cord has any type of adapter (e.g., micro USB, firewire, lighting port, Pixel port) that can transfer power from the USB connector port to an electronic device.

In one aspect, the device further includes an AC electrical plug operably coupled with the at least one battery for recharging. The AC electrical plug may be a two prong or three prong or any standard electrical plug that can plug into a standard two slot or three slot AC outlet, in any country. The AC electrical plug can be configured as the U.S. standard, and adapters can be provided for the electrical standards of any other country or location. When plugged into an outlet, directly or indirectly via an extension cord, the AC electrical plug charges the one or more batteries. The AC/DC inverter may be used to convert AC to DC to charge the battery or a dedicated recharging inverter may be included.

In one aspect, the device further includes a display screen operably coupled with the controller. The display screen can be used to view information regarding the device by the user. The display may also be a touch screen to allow for the user to input data or instructions into the device, such as varying the wattage, voltage or other parameters of the inverter or any of the other electrical outlets.

In one embodiment, the controller can be configured as a computing device having the components of a computer.

In one embodiment, the device may include a computing device having the components of a computer in addition to the controller. The computing device may be operably coupled with the display so that a user can input into the display to program or make selections to control the computing device. The computing device may provide information to the display screen for the user to receive.

In one embodiment, the device may include a pair of electrical terminals with one marked positive and one marked negative. The pair of electrical terminals may be posts or protrusions that can be coupled with positive and negative clamps of standard jumper cables so that the other end of the jumper cables can be clamped onto an external battery, such as a car battery, to recharge the external battery or use the external battery to recharge the one or more batteries of the device. The pair of electrical terminals may be a custom close configuration so that a connector having positive and negative recesses can be connected thereto, where the connector may have a cord extending therefrom with standard positive and negative clamps (e.g., similar to jumper cable clamps).

In one embodiment, a kit can include the device of one of the embodiments and one or more other components or cords or combinations thereof described herein. In one aspect, the kit includes at least one defibrillator having a defibrillator cord extending between a defibrillator pad and a defibrillator connector, preferably two defibrillators. The kit may also include a camera, DC cord, AC charging cord, USB cords, extra lights, or the like.

In one embodiment, a method of charging an electronic device can include providing the device of one of the embodiments, and electronically connecting the electronic device with the device so as to be electronically coupled with the at least one battery.

In one embodiment, a method of performing a medical procedure can include: providing the device of one of the embodiments; illuminating a light of the device on a patient; optionally extending the extendable tray, which tray holds one or more medical devices; and performing a medical procedure on the patient with one or more medical devices.

In one embodiment, a method of charging an external battery can include providing the device of one of the embodiments, and electronically connecting the external battery with a pair of electrical terminals on the device with one marked positive and one marked negative so that the external battery is electrically coupled with the at least one battery of the device.

In one embodiment, the device can be used in any method performed by a medical professional, dentist, veterinarian, electronics technician, or other person. One skilled in the art will appreciate that, for these methods and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In one embodiment, a portable power supply device can include: a device housing; a controller in the device housing; at least one battery in the device housing and operably connected to the controller; at least one electrical port operably connected to the at least one battery, the at least one electrical port being configured for providing electrical power from the at least one battery to an external electrically-powered device under control of the controller; and an extendable tray, which can be in an extended position in which the tray protrudes outwardly from the device housing, and a retracted position in which the tray is concealed within the device housing. In one aspect, the at least one battery is a lithium ion battery.

The present invention is directed to a portable power supply device which is lightweight, space-efficient and easy to carry and can be used by medical professionals, veterinarians, electronics technicians or other persons having to carry out and document complex manual procedures. The portable power supply device includes a device housing. A hand grip recess may be provided in the device housing for gripping and carrying purposes. At least one battery, such as a lithium ion battery, may be contained in the device housing. Various ports such as defibrillator connector ports and USB charging ports may be provided on the exterior of the device housing. A rotatable device support roller having an elongated roller slot may be mounted in a roller cradle in the device housing. An electronic device such as a tablet or cell phone can be inserted in the roller slot and supported at a desired orientation by rotation of the device support roller in the roller slot. A DC/AC inverter may be provided on the device housing to convert DC voltage and current into AC voltage and current for powering any of a variety of external electronic devices. A camera mount arm may be mounted on the device housing to support a video camera. A light mount arm may be mounted on the device housing to support a light.

In another aspect, the portable power supply device can further include at least one defibrillator connector port on the device housing and connected to the controller.

In another aspect, the portable power supply device can further include a female DC outlet on the device housing and connected to the controller.

In another aspect, the portable power supply device can further include a DC/AC inverter on the device housing and connected to the controller.

In another aspect, a camera mount arm may extend from the device housing to support a video camera.

In another aspect, a light mount arm may extend from the device housing to support a light.

In another aspect, a hand grip recess may be provided in the device housing for gripping and carrying the portable power supply device.

In another aspect, a roller cradle may be provided in the device housing and a device support roller having an elongated roller slot may be provided in the roller cradle to support an electronic device such as a tablet or cell phone in a desired orientation.

In another aspect, a battery level indicator may be provided in the device housing to indicate the level of electrical charge in the battery or batteries.

In another aspect, a device slot may be provided in the device housing to support an electronic device in a fixed orientation.

In one embodiment, a portable power supply device can include: a device housing; a controller in the device housing; at least one battery in the device housing and operably connected to the controller; at least one electrical port operably connected to the at least one battery, the at least one electrical port being configured for providing electrical power from the at least one battery to an external electrically-powered device under control of the controller; and an extendable tray, which can be in an extended position in which the tray protrudes outwardly from the device housing, and a retracted position in which the tray is concealed within the device housing. In one aspect, the at least one battery is a lithium ion battery. In one aspect, the device comprising at least one defibrillator connector port on the device housing that is operably connected to the at least one battery. In one aspect, the device comprising at least one female DC outlet on the device housing that is operably connected to the at least one battery. In one aspect, the device comprising a DC/AC inverter on or in the device housing that is operably connected to the at least one battery. In one aspect, the device comprising a camera mount arm movably extended from the device housing having an end with a camera mount. In one aspect, the device comprising a light mount arm movably extended from the device housing and having an end with a light. In one aspect, the device comprising a hand grip recess formed in the device housing for gripping and carrying the portable power supply device. In one aspect, the device comprising: a roller cradle formed in the device housing; and a device support roller having an elongated roller slot rotatably located in the roller cradle, the elongated roller slot being dimensioned to support an electronic device. In one aspect, the roller cradle and device support roller further comprising an angle selection mechanism that allows the rotational angle of the device support roller to be adjusted relative to the roller cradle. In one aspect, the angle selection mechanism includes a plurality of cradle ridges on the roller cradle and a plurality of roller ridges on the support roller, said cradle ridges and roller ridges being adapted to define set rotational angle positions of the device support roller relative to the roller cradle. In one aspect, the angle selection mechanism is a friction mechanism that frictionally engages the roller cradle with the device support roller at one or more defined angles. In one aspect, a battery level indicator is included on the device housing that is configured to indicate the level of electrical charge in the at least one battery. In one aspect, the device comprising a pair of electrical terminals with one marked positive and one marked negative. In one aspect, the device comprising at least one USB connector port. In one aspect, the device comprising an electrical plug operably coupled with the at least one battery for recharging. In one aspect, the device comprising a display screen operably coupled with the controller.

In one embodiment, a kit can include: the device of one of the embodiments; and at least one defibrillator having a defibrillator cord extending between a defibrillator pad and a defibrillator connector. Also, the kit may include any of the other components described herein.

In one embodiment, a method of charging an electronic device can include: proving the device of one of the embodiments; and electronically connecting the electronic device with the device so as to be electronically coupled with the at least one battery.

In one embodiment, a method of performing a medical procedure can include: providing the device of one of the embodiments; illuminating a light of the device on a patient; extending the extendable tray, which tray holds one or more medical devices; and performing a medical procedure on the patent with the one or more medical devices.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In one embodiment, the present invention can include aspects performed with or including a computing system. As such, the computing system can include a memory device that has the computer-executable instructions for performing the method. The computer-executable instructions can be part of a computer program product that includes one or more algorithms for performing any of the methods of any of the claims.

In one embodiment, any of the operations, processes, methods, or steps described herein can be implemented as computer-readable instructions stored on a computer-readable medium. The computer-readable instructions can be executed by a processor of a wide range of computing systems from desktop computing systems, portable computing systems, tablet computing systems, hand-held computing systems as well as network elements, and/or any other computing device. The computer readable medium is not transitory. The computer readable medium is a non-transitory physical medium having the computer-readable instructions stored therein so as to be physically readable from the physical medium by the computer. For example, the computer methods may include receiving input from a user to define how to charge certain electronic devices coupled with the electrical connectors of the device.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include, but are not limited to, physically mateable and/or physically interacting components and/or wirelessly interactable and/or wirelessly interacting components and/or logically interacting and/or logically interactable components.

Figure 7:
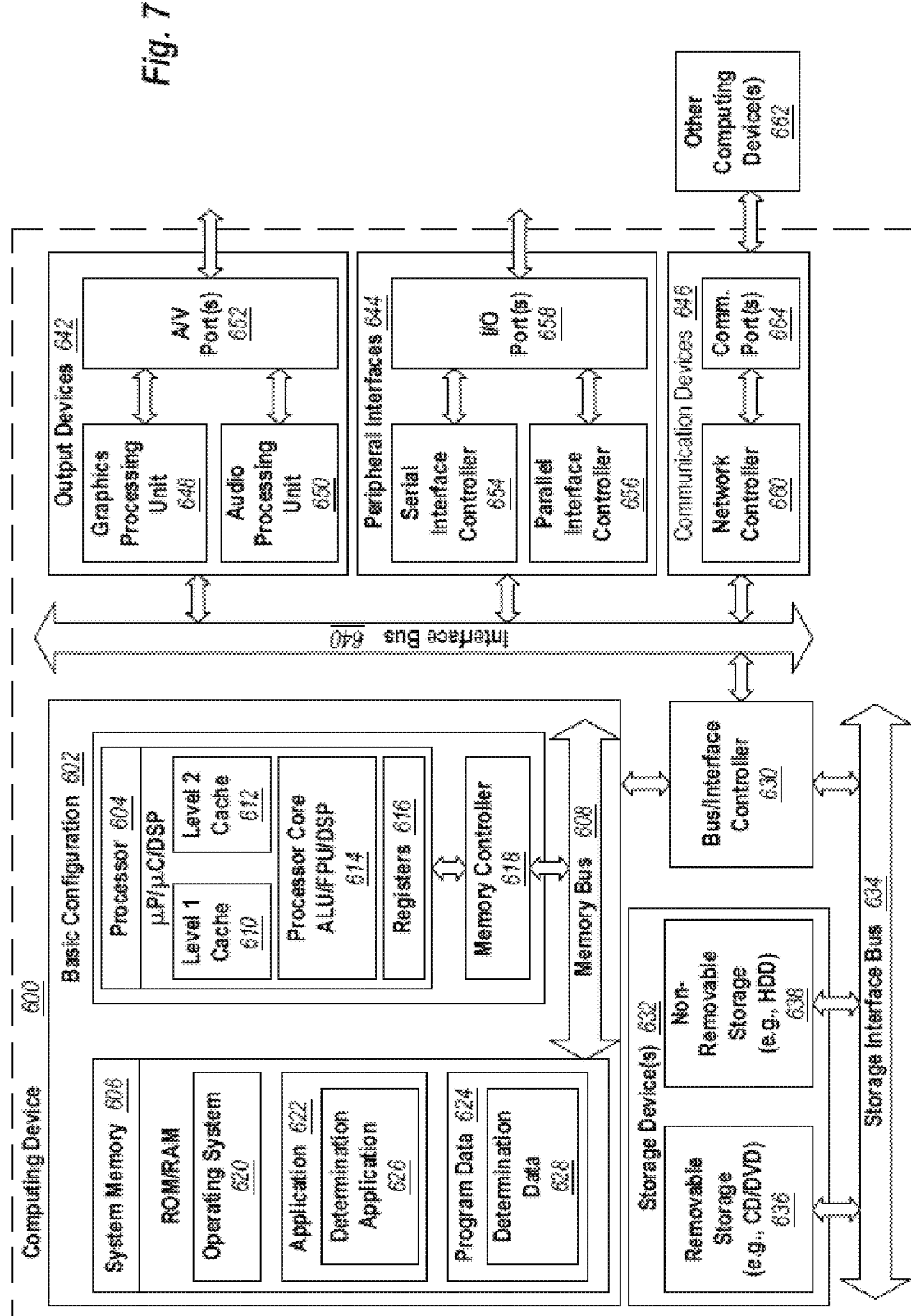
FIG. 7 represents a user operable control in the form of a computer.

FIG. 7 shows an example computing device 600 that is arranged to perform any of the computing methods described herein, such as controlling charging of electronic devices, or controlling distribution of electrical current through any of the electrical connectors. In a very basic configuration 602, computing device 600 generally includes one or more processors 604 and a system memory 606. A memory bus 608 may be used for communicating between processor 604 and system memory 606.

Depending on the desired configuration, processor 604 may be of any type including, but not limited to, a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a determination application 626 that is arranged to perform the functions as described herein including those described with respect to methods described herein. Program Data 624 may include determination information 628. In some embodiments, application 622 may be arranged to operate with program data 624 on operating system 620 such that the work performed by untrusted computing nodes can be verified as described herein.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

In one aspect, the computing device 600 can include a music module that includes the ability to receive music, either streamed or from satellite, download and save the music on the non-transitory storage medium and/or play the music via speakers. As such, the computing device 600 can interface with a fee subscription service via any network communication link.

The embodiments described herein may include the use of a special purpose or general-purpose computer including various computer hardware or software modules, such as the music module.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A portable power supply system comprising:
portable power supply device, comprising:
a device housing, wherein the device housing includes a roller cradle formed therein;
a device support roller rotationally located in the roller cradle, the device support roller being removably couplable with the roller cradle;
a controller in the device housing;
at least one battery in the device housing and operably connected to the controller; and
at least one electrical port operably connected to the at least one battery, the at least one electrical port being configured for providing electrical power from the at least one battery to an external electrically-powered device under control of the controller; and optionally, at least one component pluggable into the portable power supply device, the at least one component either providing power to the at least one battery or receiving power from the at least one battery when plugged.

2. The portable power supply system of claim 1, the portable power supply device further comprising a release mechanism.

3. The portable power supply system of claim 2, the release mechanism including a push button operably coupled to a coupler mechanism, the coupler mechanism being operably coupled to the device support roller.

4. The portable power supply system of claim 3, wherein the release mechanism and/or coupler mechanism are biased such that when the release mechanism is not activated, the device support roller is engaged with the roller cradle, and when the release mechanism is active, the device support roller is disengaged from the roller cradle so as to be removable from the portable power supply device.

5. The power supply system of claim 1, comprising a plurality of device support rollers, each device support roller having a device-receiving slot, each device-receiving slot being of a different shape and/or dimension from the other device-receiving slots of the other device support rollers.

6. The power supply system of claim 1, the roller cradle having an electrical connector that is electrically connected to an electrical adapter that is within a device-receiving slot of the device support roller.

7. The portable power supply system of claim 6, wherein the electrical adapter is retractable.

8. The portable power supply system of claim 7, comprising an electrical adapter retraction mechanism.

9. The portable power supply system of claim 8, wherein the electrical adapter retraction mechanism includes a switch that in a first position fixes the electrical adapter to be exposed in the device-receiving slot and that the switch in a second position causes the electrical adapter to be retractable into the device support rollers.

10. The portable power supply system of claim 1, further comprising a carrying case adapted and shaped to firmly retain the portable power supply device therein.

11. The portable power supply system of claim 1, wherein the at least one component is included and is a solar power system having at least one solar panel.

12. The portable power supply system of claim 11, wherein the solar power system is adapted to plug into a port on the portable power supply device in order to charge the one or more batteries.

13. The portable power supply system of claim 12, wherein the solar power system has at least one foldable solar panel.

14. The portable power supply system of claim 12, wherein the solar power system has a mechanism that automatically tilts the solar panel in accordance with receiving maximum solar rays.

15. The portable power supply system of claim 12, comprising a support pole system that is adapted to attach to the solar panel.

16. The portable power supply system of claim 13, wherein the foldable solar panel has at least two individual panels coupled together via a hinge.

17. The portable power supply system of claim 1, comprising:
a plurality of electrical ports, each electrical port having a unique color and/or pattern from the other electrical ports; and
a plurality of electrical plugs, wherein there is an electrical plug for each electrical port such that the corresponding electrical plug and electrical port have the same color and/or pattern.

18. The portable power supply system of claim 1, wherein the at least one component includes at least one headlamp having a rechargeable battery that can be recharged by the portable power supply device when electrically coupled therewith.

19. The portable power supply system of claim 1, wherein the at least one component includes at least one light stick having a plurality of LED lights and a rechargeable battery that can be recharged by the portable power supply device when electrically coupled therewith.

20. The portable power supply system of claim 1, wherein the at least one component includes at least one thermoelectric refrigerator having a rechargeable battery that can be recharged by the portable power supply device when electrically coupled therewith.

21. The portable power supply system of claim 1, comprising a plurality of electrical ports, each port being associated with a switch that turns power on/off to the associated electrical port.

22. The portable power supply system of claim 1, comprising a charging grid comprising a plurality of charging stations, each charging station having a charging contact that is adapted to contact a device contact on the portable power supply device.

* * * * *